(12) United States Patent
Hamada et al.

(10) Patent No.: US 6,191,807 B1
(45) Date of Patent: *Feb. 20, 2001

(54) COMMUNICATION APPARATUS AND METHOD FOR PERFORMING A FILE TRANSFER OPERATION

(75) Inventors: Noboru Hamada; Shuichi Kadowaki, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/445,454

(22) Filed: May 26, 1995

(30) Foreign Application Priority Data

May 27, 1994 (JP) .................................. 6-114907
Jun. 7, 1994 (JP) .................................. 6-125505

(51) Int. Cl.⁷ .................................................. H04N 7/15
(52) U.S. Cl. .......................... 348/15; 348/14; 379/93.21; 345/330; 345/348
(58) Field of Search ................ 379/93, 96, 97, 379/98, 53, 54, 93.17, 93.21, 93.23; 348/13, 14, 15, 17; 364/514 A; 395/155, 156, 157, 118, 147; 370/260, 261; 345/348, 349, 329, 330, 331

(56) References Cited

U.S. PATENT DOCUMENTS

| 5,031,121 | * | 7/1991 | Iwai | 395/147 |
|---|---|---|---|---|
| 5,305,097 | | 4/1994 | Sato et al. | 348/14 |
| 5,428,734 | * | 6/1995 | Haynes et al. | 345/349 |
| 5,444,770 | * | 8/1995 | Davis et al. | 379/93.33 |
| 5,521,335 | * | 5/1996 | Oka | 379/96 |
| 5,530,865 | * | 6/1996 | Owens et al. | 395/155 |
| 5,564,018 | * | 10/1996 | Flores et al. | 709/206 |
| 5,596,694 | * | 1/1997 | Capps | 345/349 |
| 5,617,539 | * | 4/1997 | Ludwig et al. | 370/260 |
| 5,706,454 | * | 1/1998 | MacPhail | 345/348 |
| 5,724,532 | * | 3/1998 | Thomson | 345/346 |

FOREIGN PATENT DOCUMENTS

0574138 * 12/1993 (EP) .......................... H04N/7/15

OTHER PUBLICATIONS

IBM Technical Disclosure Bulletin, vol. 37 No. 4A; Apr. 1994 "User Interface Design for Videoconferencing Entries."*

* cited by examiner

Primary Examiner—Stella Woo
(74) Attorney, Agent, or Firm—Fitzpatrick, Cella, Harper & Scinto

(57) ABSTRACT

A pointing cursor is moved to a position on a file icon to be transferred in a file list using a position input unit. Thereafter, a button of the position input unit is depressed to select the file icon. The position input unit is moved while depressing its button so as to move the pointing cursor into a display area of a received image, and thereafter, the button of the position input unit is released. At this time, a drag & drop event is generated by a basic software program. Therefore, by only dragging the icon of the file to be transferred by operating the position input unit, an instruction input for a series of file transfer processes can be attained, and the operability for the file transfer function can be improved.

43 Claims, 33 Drawing Sheets

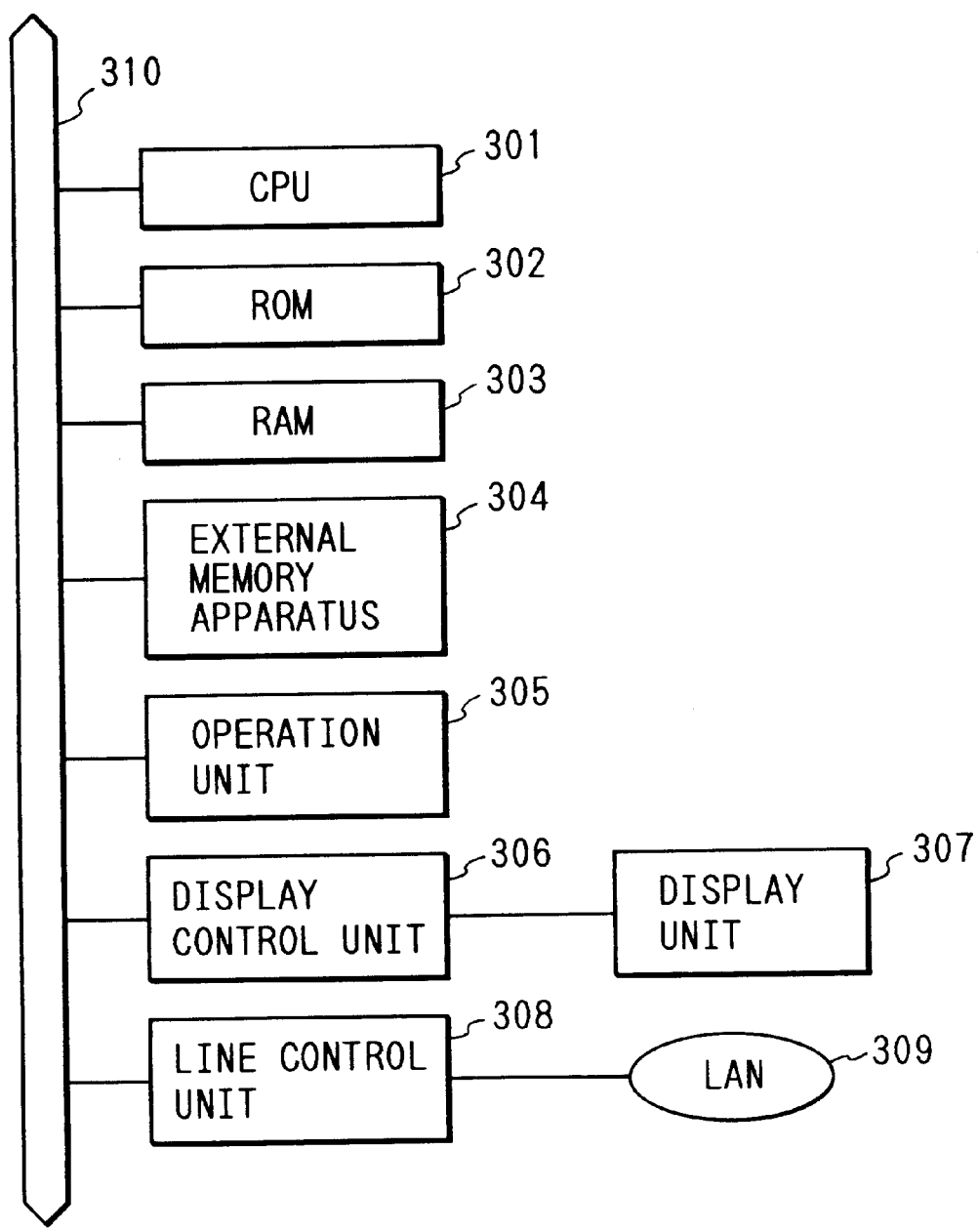

FIG. 15

| Lp | Cm | Cx(1) | Cx(2) | Cy(1) | Cy(2) | T(i) |
|---|---|---|---|---|---|---|

FIG. 24

| Lp | Cm | Fx(1) | Fx(2) | Fy(1) | Fy(2) | Bm(i, j) |
|---|---|---|---|---|---|---|

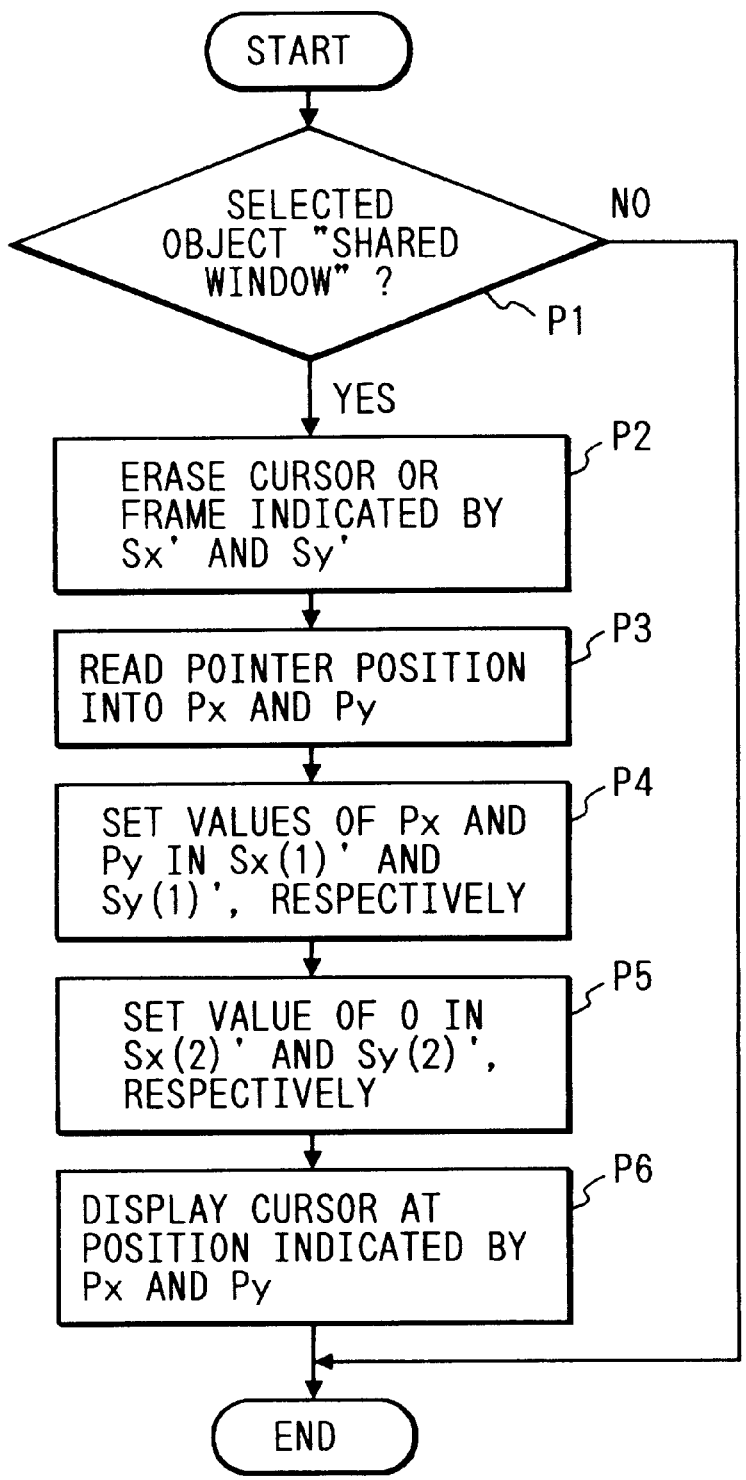

COMMUNICATION APPARATUS AND METHOD FOR PERFORMING A FILE TRANSFER OPERATION

BACKGROUND OF THE INVENTION

1. Field of the Invention

The present invention relates to a communication apparatus and a communication system, which can perform a file transfer operation.

2. Related Background Art

In recent years, communication apparatuses which can use both video and audio data, such as television telephone systems, have been popularly used. Some of these television telephone systems have a file transfer function.

As a method of designating a file to be transferred in such a television telephone system, a method of designating a file to be transferred by inputting a file name in a displayed file name dialog box by a user, a method of designating a file to be transferred by designating a file name as an argument upon execution of a file transfer command after a personal computer function is started like in a television meeting system of U.S. Videotelecom Corp., and the like are known.

However, the above-mentioned procedures require cumbersome operations for inputting a file name, resulting in poor operability.

SUMMARY OF THE INVENTION

It is an object of the present invention to provide a communication apparatus which can solve the above-mentioned problem.

It is another object of the present invention to provide a communication apparatus with good operability.

In order to achieve the above objects, according to a preferred aspect of the present invention, there is provided a communication apparatus comprising: display means for displaying information associated with an external apparatus with which the communication apparatus communicates, and information belonging to the communication apparatus; instruction means for instructing movement of a display position, on the display means, of the information belonging to the communication means; and transmission means for, when the instruction means instructs movement of the display position, on the display means, of the information belonging to the communication means onto a display area, on the display means, of the information associated with the external apparatus, transmitting the information belonging to the communication means to the external apparatus.

It is still another object of the present invention to provide a communication apparatus which provides good operability upon transmission of a file to a plurality of remote communication apparatuses.

It is still another object of the present invention to provide a communication apparatus which can perform an appropriate file transmission operation in correspondence with the function of a partner apparatus.

It is still another object of the present invention to provide a communication apparatus having a new function.

Other objects and features of the present invention will become apparent from the following detailed description of the embodiments taken in conjunction with the accompanying drawings.

BRIEF DESCRIPTION OF THE DRAWINGS

FIG. 11 is a block diagram showing a communication apparatus according to each of the third to seventh embodiments of the present invention;

FIG. 15 is a view showing the format of a packet transmitted from a line control unit;

FIG. 24 is a view showing the format of a packet transmitted from the line control unit;

FIG. 25 is a flow chart showing the processing started upon clicking of a mouse button;

DETAILED DESCRIPTION OF THE PREFERRED EMBODIMENTS

First Embodiment

The first embodiment according to the present invention will be described below with reference to the accompanying drawings. In this embodiment, a television telephone apparatus will be exemplified as a communication apparatus. However, the present invention is not limited to this, but may be applied to various other apparatuses such as a television meeting system, computer communications, and the like.

Figure 1:
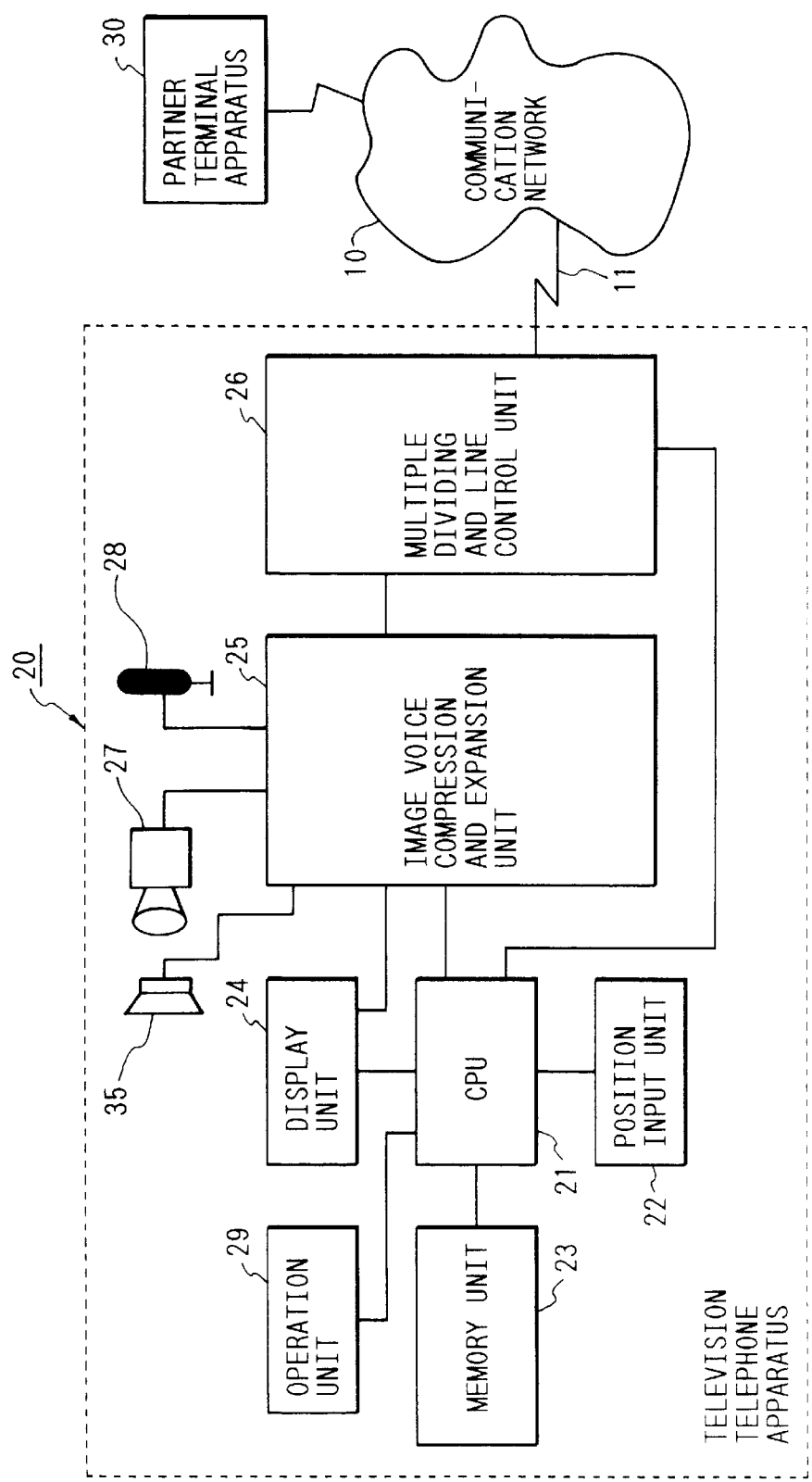
FIG. 1 is a block diagram showing the arrangement of a television telephone system according to the first embodiment of the present invention.
Figure 2:
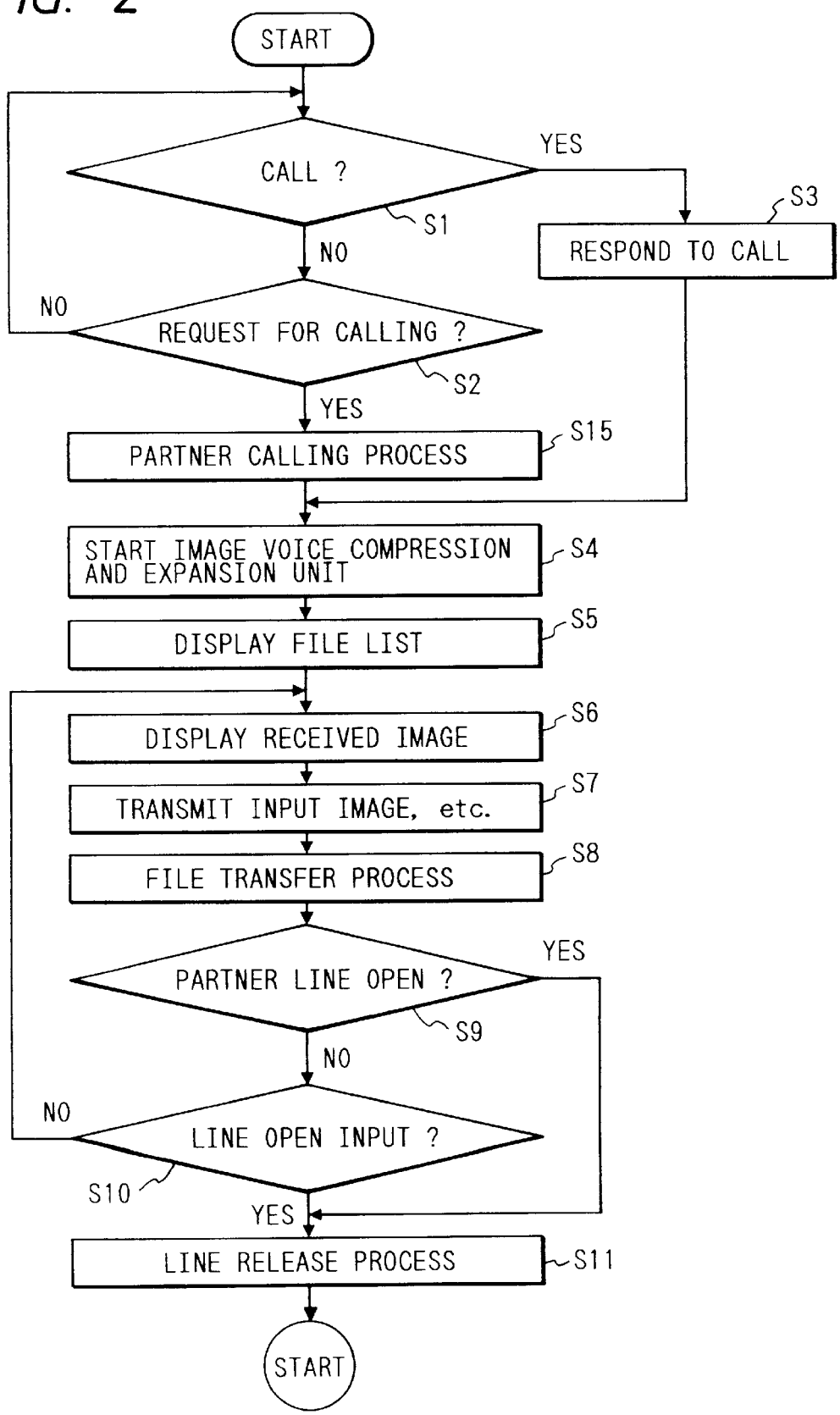
FIG. 2 is a flow chart showing communication control of the apparatus of the first embodiment.
Figure 3:
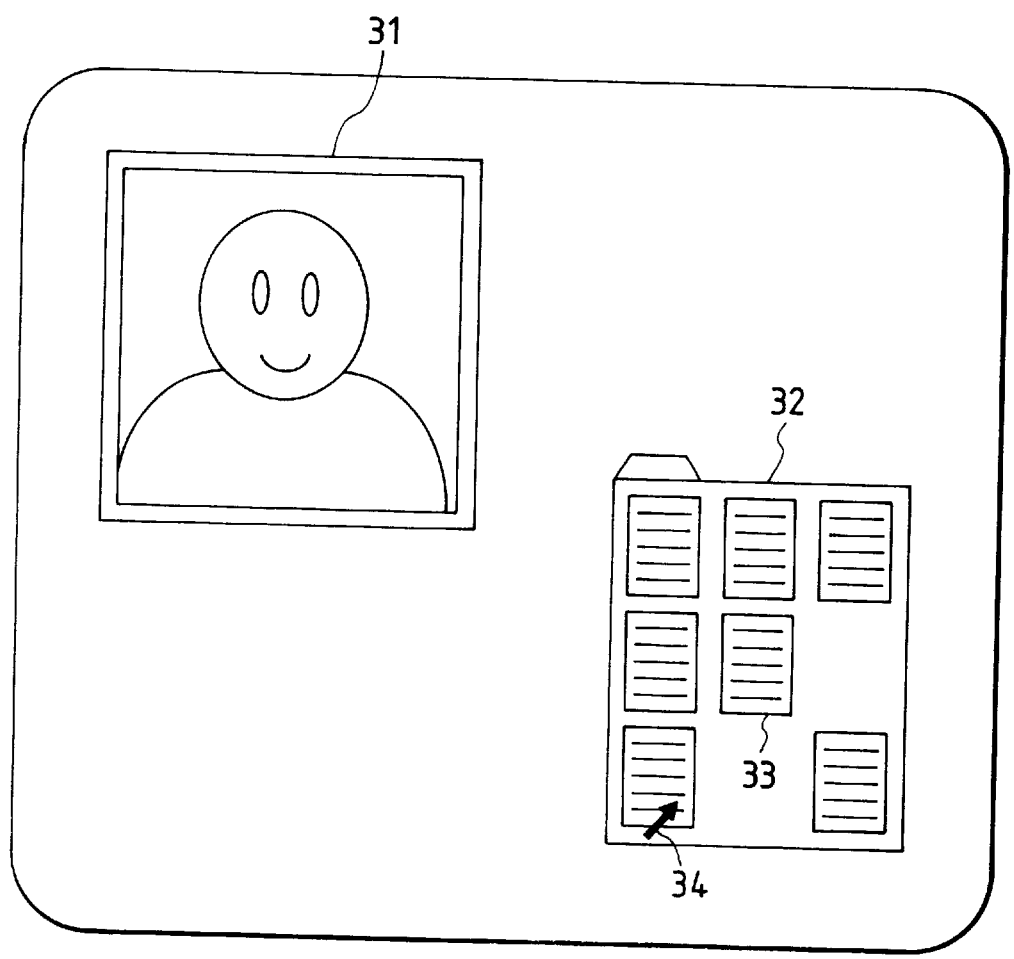
FIG. 3 is a view showing an example of a screen display on a display unit in the first embodiment.
Figure 4:
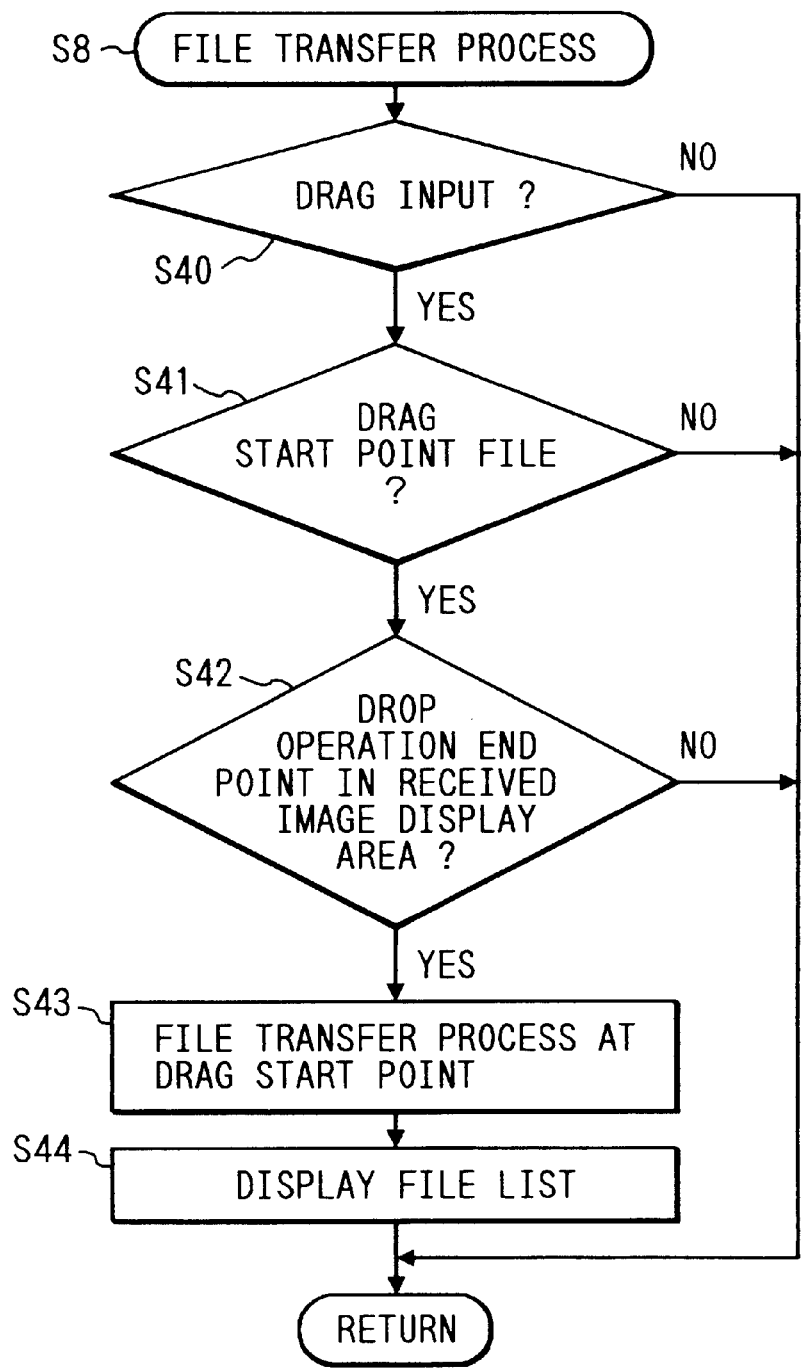
FIG. 4 is a flow chart showing the details of file transfer control in FIG. 3.

FIG. 1 is a block diagram showing the arrangement of a television telephone apparatus to which a file transfer sequence start method (to be described in detail later) according to the first embodiment of the present invention can be applied. FIG. 2 is a flow chart showing the control operation in the television telephone apparatus shown in FIG. 1, FIG. 3 is a view showing an example of a screen display, and FIG. 4 is a flow chart showing in detail the file transfer processing shown in FIG. 2.

Referring to FIG. 1, a partner terminal apparatus 30 is connected to a television telephone apparatus 20 of this embodiment via a communication network 10 to which a television telephone system and the like can be connected.

The television telephone apparatus of this embodiment shown in FIG. 1 comprises the following arrangement, i.e., a CPU 21 for controlling the entire apparatus of this embodiment in accordance with, e.g., a control sequence (to be described later) shown in FIG. 2 stored in a memory unit 23 (to be described later), a position input unit 22 which comprises, e.g., a mouse to be operated by a user to operate the television telephone apparatus, the memory unit 23 for storing a program for controlling the television telephone apparatus, and communication data, a display unit 24 for displaying a received image obtained from an image voice compression and expansion unit 25 and various kinds of information for a user, and the image voice compression and expansion unit 25 for compressing an input image from an image input unit 27 and input voice information from a voice input unit 28 and supplying the compressed data to a multiple dividing and line control unit 26 in a transmission mode, and for expanding received image and voice data divided by the multiple dividing and line control unit 26 and supplying the expanded data to the display unit 24 and a voice output unit 35 in a reception mode.

Also, the apparatus 20 comprises the multiple dividing and line control unit 26 for multiplexing/dividing voice, image, and various other data, and controlling a communication line, the image input unit 27 comprising, e.g., a television camera device for inputting image data, the voice input unit 28 comprising, e.g., a microphone for inputting voice data, an operation unit 29 for designating and inputting, e.g., a partner's telephone number, and the voice output unit 35 comprising, e.g., a loudspeaker for outputting voice data. Note that a communication line 11 is connected to the communication network 10.

The operation of the television telephone apparatus of this embodiment with the above arrangement will be described below with reference to the flow chart of FIG. 2. In the following description, a communication between this television telephone apparatus and the television telephone apparatus 30 connected to the communication network 10 will be exemplified. However, the partner terminal apparatus of this embodiment is not limited to the television telephone apparatus 30, as long as the terminal apparatus can be connected to the communication network 10. Of course, a communication can be performed with an apparatus which cannot transmit/receive a photographed image. In this case, a message indicating no image is received from a partner terminal is displayed on a received image display area (to be described later) of the display unit 24, so that a user of this television telephone apparatus can identify that the partner terminal cannot transmit a photographed image. Also, this area is designated in an area designation for file transfer (to be described later), thus allowing the same operation as that of the television telephone apparatus.

The operation of this embodiment with the above arrangement will be described below with reference to the flow chart in FIG. 2.

The television telephone apparatus of this embodiment monitors in steps S1 and S2 if a call from the partner apparatus is sent from the communication network via the communication line, and the multiple dividing and line control unit 26 detects this call, or if a request for calling is input from the operation unit 29.

If a call signal from the partner apparatus is detected, the control of the CPU 21 advances from step S1 to step S3 to respond to the call in such a manner that the CPU 21 controls the multiple dividing and line control unit 26 to form a communication path by forming a DC loop in the communication line 11 (when the communication network 10 is a public telephone network), or to send back a predetermined response message to the call (when the communication network 10 is a digital network). In step S4, the CPU 21 starts the image voice compression and expansion unit 25 to start an image input operation of the image input unit 27 and a voice input operation of the voice input unit 28. In this case, the image input from the image input unit 27 is displayed on the display unit 24, and the image input position adjustment, or the like is performed, if necessary.

In step S5, files stored in the memory unit 23 are searched, and the detected files are iconized and displayed as file icons, which are unique to the files and specify the file names of the files stored in the memory 23, in a specific figure (folder figure) indicating the storage position of the files in the memory unit 23 on a predetermined display area of the display unit 24.

FIG. 3 shows a display example. Referring to FIG. 3, a specific figure (folder figure) 32 indicates the storage position of files in the memory unit 23, and includes file icons 33. Note that a received image 31 from the partner terminal apparatus (e.g., the television telephone apparatus) is also displayed. A pointing cursor 34 moves in accordance with a position instruction input from the position input unit 22.

In step S6, the multiple dividing and line control unit 26 receives communication data sent from the partner apparatus via the communication network 10 and the communication line 11, divides image and voice data, which are sent as multiplexed data, from each other, and supplies the divided data to the image voice compression and expansion unit 25. The image voice compression and expansion unit 25 performs a predetermined expansion process to restore data before compression. The image data is supplied to the display unit 24, and is displayed as received image data on the received image 31 of the display unit 24, as shown in FIG. 3. On the other hand, the received voice data is supplied to the voice output unit 35, and is output as a voice. Note that the voice output unit 35 is not limited to an independent loudspeaker, but may be integrated with the voice input unit 28 as a handset of a telephone set. The above-mentioned control is always executed while communication data is sent from the partner apparatus.

Simultaneously with the above-mentioned processes in steps S5 and S6, image data input from the image input unit 27 and voice data input from the voice input unit 28 are compressed by the image voice compression and expansion unit 25 in step S7. The compressed data are multiplexed by the multiple dividing and line control unit 26, and the multiplexed data is transmitted to the partner apparatus via the communication line 11 and the communication network 10.

Subsequently, a file transfer process based on an operation unique to this embodiment is performed. In this process, file data, which is pre-stored in the memory unit 23 as needed, is further multiplexed on the image and voice data, and the like (or is multiplexed in place of image data), and the multiplexed data is transmitted. This file transfer process will be described later.

It is then checked in step S9 if the partner apparatus has ended the communication by, e.g., opening the line. If NO in step S9, the flow advances to step S10 to check if an operator of its own apparatus inputs a communication end instruction. If NO in step S10, the flow returns to step S6 to continue the television telephone communication with the partner apparatus.

On the other hand, if a communication end instruction is detected in step S9 or S10, the flow advances to step S11, and the CPU 21 controls the multiple dividing and line control unit 26 to open the communication path formed in the communication line. Thereafter, the flow returns to step S1 to monitor the next call or the next request for calling.

If a request for calling is detected, the flow advances from step S2 to step S15 to originate a call to a partner apparatus (e.g., the partner terminal apparatus 30 such as a television telephone apparatus) designated by a partner's telephone number input from the operation unit 29. If the partner apparatus responds to the call, the flow advances to the processes in step S4 and subsequent steps, and the voice and image communications, file transfer process, and the like are performed with the partner apparatus by substantially the same processes as in the case of the call from the partner apparatus.

FIG. 4 shows in detail the above-mentioned file transfer process of files stored in the memory unit 23. The file transfer process of this embodiment will be described below with reference to FIG. 4.

In this embodiment, the file list 32, the file icons 33, and the pointing cursor 34 are displayed on the display unit 24 together with the received image 31, as shown in FIG. 3. The pointing cursor 34 is moved on the screen as a user moves the position input unit 22 such as a mouse.

Upon execution of the file transfer process, a user moves the pointing cursor 34 using the position input unit 22 to the position on an icon 33 of a file to be transferred in the file list 32. Thereafter, the user depresses a button of the position input unit 22 to select the file icon 33. In this case, the CPU 21 stores information indicating that the start point of the drag & drop operation is the file icon 33, and the file name of the file. This sequence is normally realized by a basic software program, and a user program is unaware of this sequence.

Then, the user moves the position input unit 22 to a position in the received image 31 of the received image while depressing the button of the position input unit 22, and then releases the button of the position input unit 22. At this time, a drag & drop event is generated by the basic software program. Therefore, in this embodiment, the user need only drag the icon of a file to be transferred by operating the position input unit 22, thus completing an instruction input for a series of file transfer processes. The processing sequence of this event will be described below with reference to FIG. 4.

It is checked in step S40 if a drag input as a file transfer instruction is detected. If NO in step S40, since no file transfer request is generated, the flow returns to the main routine without executing any processing. On the other hand, if YES in step S40, the flow advances to step S41. In step S41, data associated with the start point of the drag & drop operation is acquired from the memory unit 23, and it is checked if the start point of the drag & drop operation is a file icon display position displayed in the display area of the file list 32. If NO in step S41, the flow returns to the main routine, thus ending this process.

On the other hand, if YES in step S41, the flow advances to step S42 to check if the end point of the drag & drop operation falls within the display area of the received image 31. If NO in step S42, the flow returns to the main routine, thus ending this process.

On the other hand, if YES in step S42, the flow advances to step S43. In step S43, the file name of the file selected at the beginning of the drag & drop operation is acquired from the memory unit 23, and a file transfer process for transferring the selected file to a communication partner terminal is executed. More specifically, the CPU 21 reads out the file of the selected icon from the memory unit 23, and sends it to the image voice compression and expansion unit 25. After the data is subjected to a predetermined compression process in the unit 25, a data identification flag is added to the compressed data, and the data is supplied to the multiple dividing and line control unit 26, thus transferring the file to the partner apparatus. Upon completion of the file transfer process, the processing sequence of the drag & drop event ends.

In the above description, when it is programmed to delete a file which has been subjected to the transfer process from the memory unit 23 upon management of files stored in the memory unit 23, the number of files in the memory unit 23 is decreased by one with the above-mentioned file transfer process. For this reason, in this case, a process in step S44 in FIG. 4 is executed to delete the file transferred in the above-mentioned process from the memory unit 23, and to update the displayed file list, so that the remaining files in the memory unit 23 at that time are displayed in the file list 32. Thereafter, the flow returns to the main routine.

The above description has been made in association with only an embodiment of the present invention, and the scope of the present invention is not limited to the above embodiment.

As described above, according to this embodiment, a sense-oriented interface utilizing the features of a television telephone apparatus which can display a partner image is provided, and operability upon start of the file transfer function in the television telephone apparatus can be improved.

In the above embodiment, a stand-alone television telephone apparatus has been exemplified. Alternatively, the present invention may be applied to either a system constituted by a plurality of apparatuses (e.g., a TV meeting system) or an apparatus consisting of a single device.

The present invention can also be applied to a case wherein the invention is achieved by supplying a program to the system or apparatus.

As described above, according to this embodiment, operability upon execution of the file transfer function in a communication apparatus or a communication system such as a television telephone apparatus or a television conference system can be greatly improved.

In addition, since designation of a file to be transferred and designation of the destination of the file are realized by a simple operation, i.e., the drag operation of an icon, the file to be transferred and its destination can be designated very easily without requiring any special knowledge, and everyone can easily execute a file transfer operation.

Second Embodiment

Another embodiment of the present invention will be described below. This embodiment has as its object to improve the operability for a file transfer operation upon execution of multi-point communications.

Figure 5:
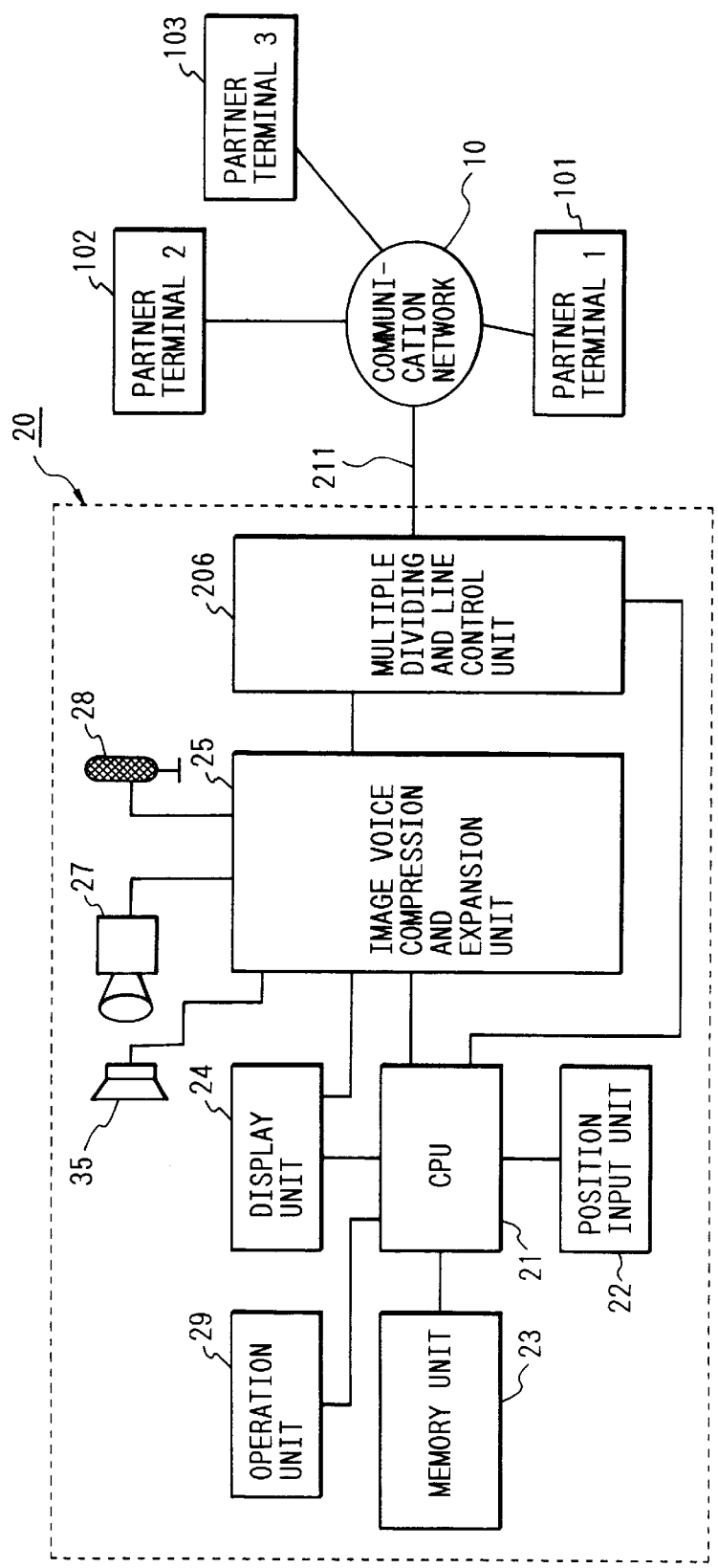
FIG. 5 is a block diagram showing the arrangement of a television telephone system to which the second to fourth embodiments of the present invention are applied.

FIG. 5 shows a television telephone apparatus to which this embodiment can be applied. The same reference numerals in FIG. 5 denote the same parts as in FIG. 1, and a detailed description thereof will be omitted. The difference between this embodiment and the first embodiment resides in a multiple dividing and line control unit 206. Unlike the multiple dividing and line control unit 26 in FIG. 1, the unit 206 can cope with a plurality of lines, and allows speech communications with two or more ground terminals. A communication line 211 has a larger capacity than that in the first embodiment, accordingly.

The operation of the television telephone apparatus of this embodiment with the above arrangement will be described below with reference to the flow chart in FIG. 6. In the following description, communications among television telephone apparatuses 101, 102, and 103 connected to the communication network 10 will be exemplified. However, in this embodiment as well, the communication partner is not limited to a television telephone apparatus as long as a terminal apparatus can be connected to the communication network 10.

Figure 6:
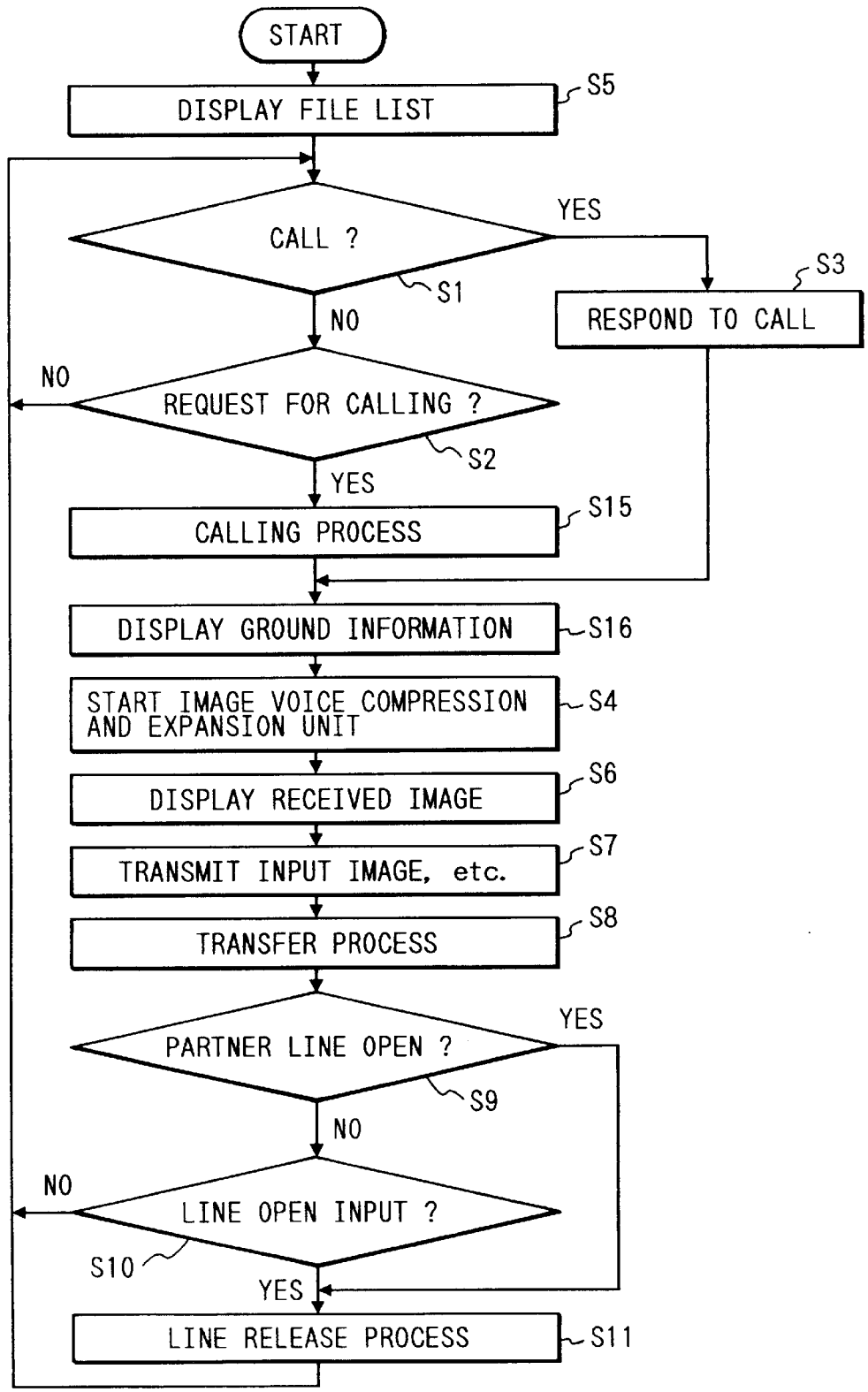
FIG. 6 is a flow chart showing communication control of the television telephone system to which the second embodiment is applied.

FIG. 6 is a flow chart showing the control operation of the television telephone apparatus of this embodiment. This control operation is substantially the same as the operation which has been described in the first embodiment with reference to FIG. 2. Thus, the same step numbers in FIG. 6 denote the same operations as in FIG. 2, and a detailed description thereof will be omitted. Only different steps from the first embodiment will be described below.

Figure 7:
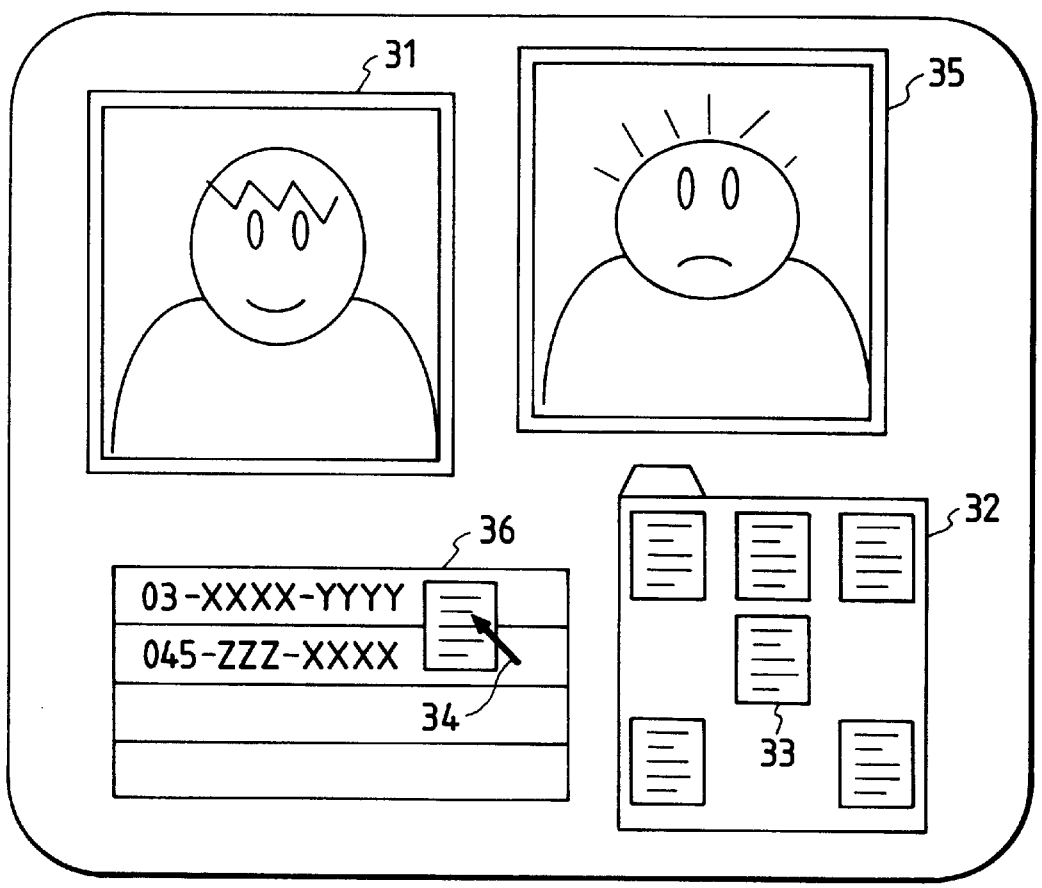
FIG. 7 is a view showing an example of a screen display of the second embodiment.

The television telephone apparatus of this embodiment displays a file list in step S5. The flow then advances to step S1 to check if a call from another terminal is detected. Thereafter, the same processes as in the first embodiment are executed up to step S15. After the process in step S15, the flow advances to step S16 in this embodiment, and ground information associated with a partner terminal whose call is connected is displayed on a predetermined display area of the display unit 24. FIG. 7 shows this state. Referring to FIG. 7, the display unit 24 displays received images 31 and 35 from partners in speech communication, the folder FIG. 32, the pointing cursor 34, and ground information displayed on a ground information display area 36. In this embodiment, it is not indispensable to display a received image from a partner in speech communication. In this embodiment, the telephone number of a partner in speech communication is displayed as the ground information. In this case, when a communication is started upon reception of a call, the telephone number transmitted from the partner terminal at the beginning of the communication is used; when a communication is started by originating a call, the telephone number stored upon originating the call is used.

After the process in step S16, the flow advances to step S4. Thereafter, the processes up to step S10 are executed in the same manner as in the first embodiment.

In step S10, it is checked if an operator of his own terminal inputs a communication end instruction with a given communication partner. If YES in step S10, the flow advances to step S11 to end the communication with only the designated communication partner, and the flow returns to step S1. On the other hand, if NO in step S10, the flow also returns to step S1.

With the above-mentioned control, communications can be simultaneously performed with a plurality of partners.

The transfer process in step S8 in this embodiment during the above-mentioned communication control will be described in detail below with reference to FIG. 8.

In this embodiment, an operation for starting a file transfer sequence is substantially the same as that in the first embodiment, except that when the drop end point of the drag & drop operation falls within the ground information display area 36, a file is transferred to all the partners involved in communication in progress.

The process sequence of this operation will be described below with reference to FIG. 8.

Figure 8:
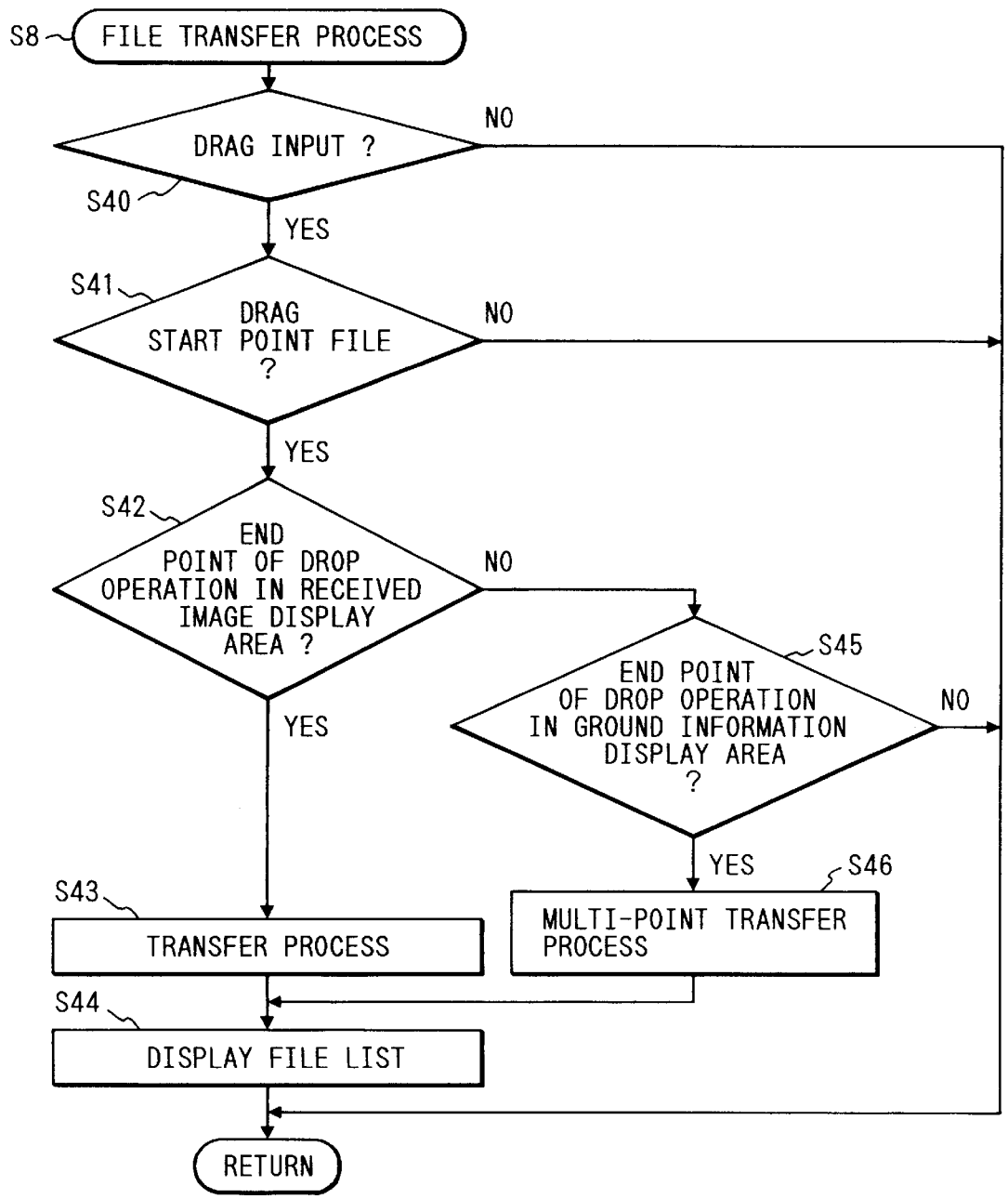
FIG. 8 is a flow chart showing the detailed sequence of a file transfer operation in FIG. 7.

In the sequence shown in FIG. 8, steps S45 and S46 are added to the sequence which has been described in the first embodiment with reference to FIG. 4.

The same operations as in the first embodiment are executed from step S40 to step S42, and if it is determined in step S42 that the end point of the drop operation does not fall within the received image display area, the flow advances to step S45. In step S45, it is checked if the end point of the drop operation falls within the ground information display area. If YES in step S45, the flow advances to step S46 to execute the file transfer process to all the partners in communication. Thereafter, the flow advances to step S44. On the other hand, if NO in step S45, the flow returns to the main routine.

In this embodiment, when the drop end point falls within the ground information display area, the file transfer process is performed for all the terminals in communication. Alternatively, prior to the drag & drop operation, desired terminals (one to all) may be designated, and thereafter, the drop operation may be performed in the ground information display area 36 to transfer the dragged file to only the desired terminals.

According to this embodiment, the operability for the file transfer process in multi-point communications can be improved.

Third Embodiment

Still another embodiment of the present invention will be described below.

A television telephone apparatus to which this embodiment can be applied is the same as that in the second embodiment, and a detailed description thereof will be omitted since it has already been described above. Also, the control sequence of the entire apparatus is the same as that in the second embodiment, and a detailed description thereof will be omitted since it has already been described above with reference to FIG. 6. In this embodiment, however, the ground information display operation in step S16 may be omitted.

In this embodiment, the file transfer sequence is started by the following operation. More specifically, after the file transfer mode is started by, e.g., moving the pointing cursor by operating the position input unit 22, and selecting a file to be transferred on the folder figure by clicking the button of the unit 22, the position input unit 22 is operated again to move the pointing cursor, and received image display areas on which partners to which the file is to be transferred are selected in turn by clicking the button of the unit 22, thereby transferring the selected file to the selected partners. Finally, the file transfer mode is canceled by, e.g., double-clicking the button of the position input unit 22, thus ending the file transfer sequence.

Figure 9:
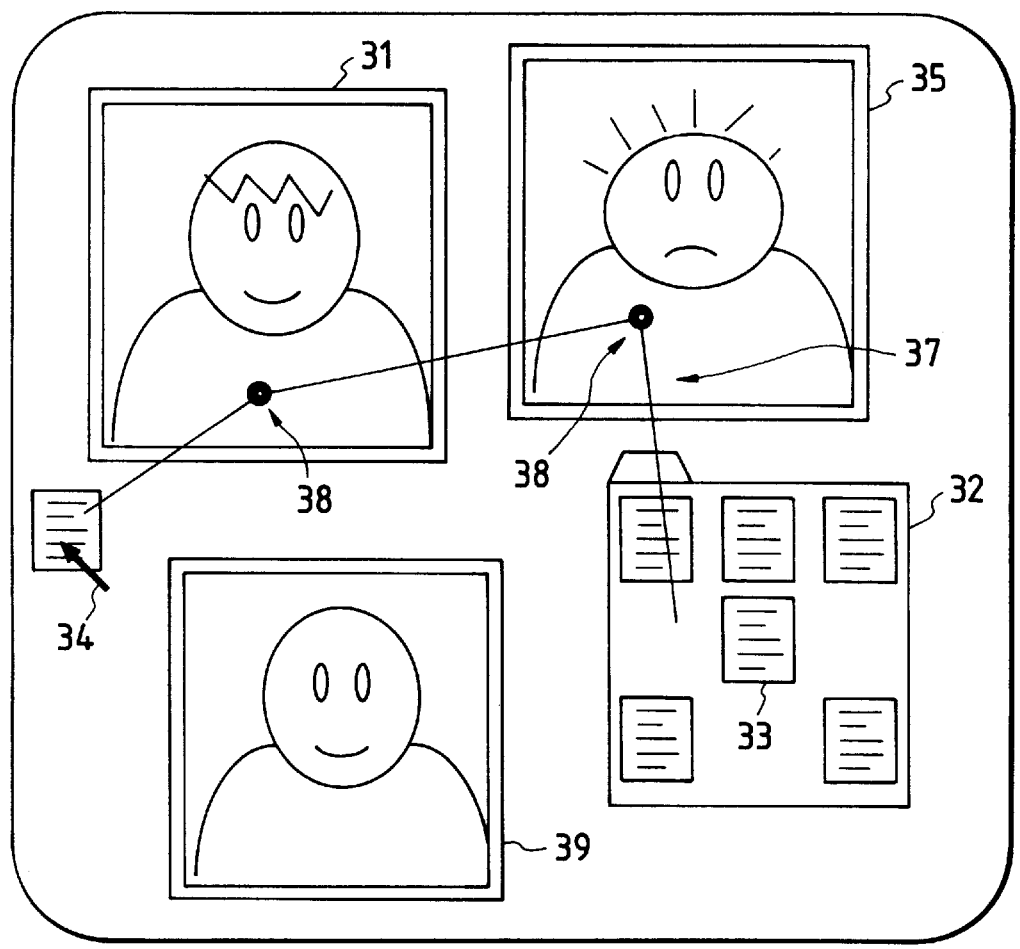
FIG. 9 is a view showing an example of a screen display of the third embodiment.

FIG. 9 shows the above-mentioned operation state. Referring to FIG. 9, the display unit 24 displays received image display areas 31, 35, and 39 for displaying images received from communication partners, the folder FIG. 32 for displaying a file list, the file icons 33 indicating files, the pointing cursor 34. The pointing cursor is moved along a path 37 after the file transfer mode is started, and the button of the position input unit 22 is clicked at points 38. In this case, the selected file is transferred to partners displayed on the areas 31 and 35. Note that the moving path 37 and the clicking points 38 need not be displayed on the screen.

Figure 10:
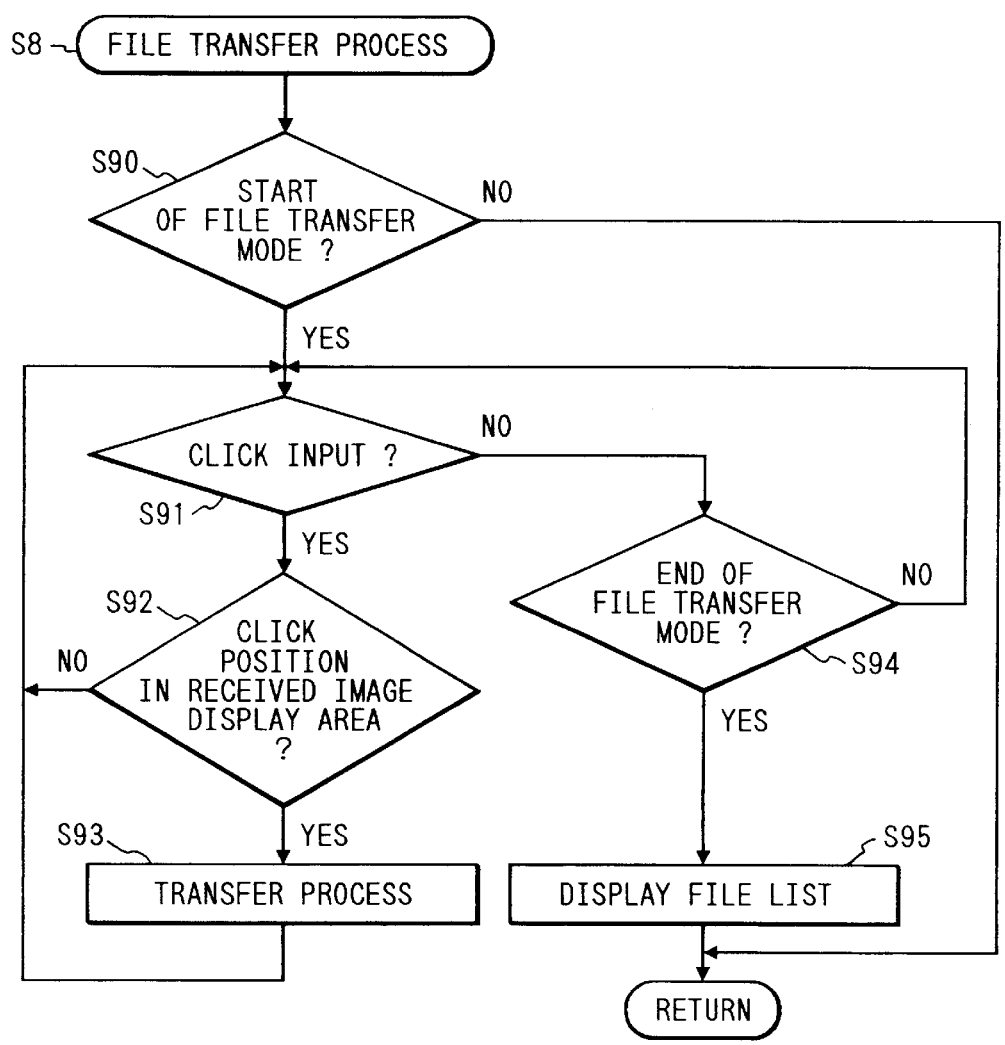
FIG. 10 is a flow chart showing the detailed sequence of a file transfer operation in FIG. 9.

The above-mentioned operation sequence will be described below with reference to FIG. 10.

It is checked in step S90 if the file transfer mode is started. More specifically, this decision step is attained when the CPU 21 checks whether or not the switch (button) of the position input unit 22 is depressed while the pointing cursor 34 is located on the file icon. If NO in step S90, the flow returns to the main routine. If YES in step S90, the flow advances to step S91 to check if the switch of the position input unit 22 is depressed. If YES in step S91, the flow advances to step S92 to check if the depressed position of the switch of the position input unit 22 falls within the received image display area. If YES in step S92, the flow advances to step S93, and a file transfer process is executed for a partner corresponding to the displayed received image. More specifically, a file corresponding to the file icon selected by clicking upon start of the file transfer mode in step S90 is read out from the memory unit 23. If it is determined in step S92 that the clicked position falls within the received image display area, the data corresponding to the selected file is supplied to the multiple dividing and line control unit 206 so as to transfer the data to a partner terminal corresponding to the selected received image. Upon completion of the process in step S93, the flow returns to step S91 to check if the next transfer partner is designated. If NO in step S91, the flow advances to step S94. If an end instruction of the file transfer mode is detected in step S94, the file transfer mode ends. More specifically, the decision step is attained by detecting the above-mentioned end instruction, e.g., whether or not the switch of the position input unit 22 is depressed twice quickly (double-clicked). However, if it is determined in step S94 that an end instruction of the file mode is not detected, the flow returns to step S91 to wait for designation of the next transfer partner. On the other hand, if it is determined in step S94 that an end instruction of the file transfer mode is detected, the file transfer sequence ends. When it is programmed to delete the transferred file after the file transfer process, the flow advances from step S94 to step S95, and the file icon of the transferred file is deleted from the file icons displayed on the file list figure. Thereafter, the file list is re-displayed, and the file transfer process ends. Then, the flow returns to the main routine. According to this embodiment, since a user can designate file transfer destinations while observing received images in multi-point communications, a file transfer process convenient for the user can be realized.

Fourth Embodiment

In each of the first to third embodiments, before a file is actually transferred in the file transfer step, i.e., step S43, S46, or S93, e.g., at the beginning of the file transfer mode or a communication, the remaining capacity of a memory device of a partner terminal may be received as a portion of multiplexed data transferred via the communication line 11. The multiplex dividing and line control unit 26 or 206 may divide the remaining capacity data from the received data, and may supply the divided remaining capacity data to the CPU. If the CPU determines that the memory device of the partner terminal does not have a remaining capacity enough to store a file to be transmitted, the file transfer process may be inhibited. With this control, a wasteful transfer operation can be omitted, and high-speed processes can be realized.

The operation unit 29 is not limited to a hardware unit, but may be realized by a software keyboard displayed on the display unit 24. Thus, the application range of this embodiment may be widened as long as the basic functions of the respective blocks or the sequences are not lost.

As described above, according to this embodiment, a sense-oriented interface utilizing the features of a television telephone apparatus which can display a partner image is provided, and operability upon start of the file transfer function in the television telephone apparatus can be improved.

Note that this embodiment may be applied to either a system constituted by a plurality of apparatuses (e.g., a TV meeting system) or an apparatus consisting of a single device.

This embodiment can also be applied to a case wherein the invention is achieved by supplying a program to the system or apparatus.

As described above, according to the second to fourth embodiments of the present invention, operability upon start of the file transfer function in a communication apparatus can be greatly improved.

In addition, since designation of a file to be transferred and designation of the destination of the file are realized by a simple operation, i.e., the drag operation of an icon, the file transfer operation can be performed very easily without requiring any special knowledge.

Fifth Embodiment

In the first to fourth embodiments described above, the methods of improving operability upon execution of file transfer have been exemplified.

In the fifth and sixth embodiments, a communication apparatus, which can not only perform the file transfer operation, but also share a file such as a text file, image file, or the like by a simple operation by transmitting a file to a partner apparatus and opening the file by dragging and dropping an icon indicating a file such as a text file, an image file, or the like onto a shared window generally used in a television meeting, will be described.

A case will be described below wherein a text in a file is developed on the shared window.

FIG. 11 is a block diagram showing the arrangement of a communication apparatus of this embodiment. Referring to FIG. 11, a CPU 301 controls the entire apparatus. A ROM 302 stores a program to be executed by the CPU 301, and a RAM 303 stores various data used by the CPU 301.

An external memory apparatus 304 comprises a magnetic disk, an optical disk, a hard disk, or the like for storing various files (text files, image files, and the like) used by the CPU 301. An operation unit 305 comprises a keyboard, a mouse, and the like which are used for operating the apparatus of this embodiment. A display control unit 306 controls a display unit 307 comprising a CRT (cathode ray tube), an LCD (liquid crystal display), or the like.

A line control unit 308 controls an interface of, e.g., a LAN (Local Area Network), or the like. The apparatus of this embodiment is connected to other communication partner apparatuses via a line 309 such as a LAN. A bus 310 connects the above-mentioned constituting blocks 301 to 306, and 308.

The communication apparatus with the above-mentioned arrangement is connected to other communication apparatuses with similar arrangements via the line 309.

Figure 12A:
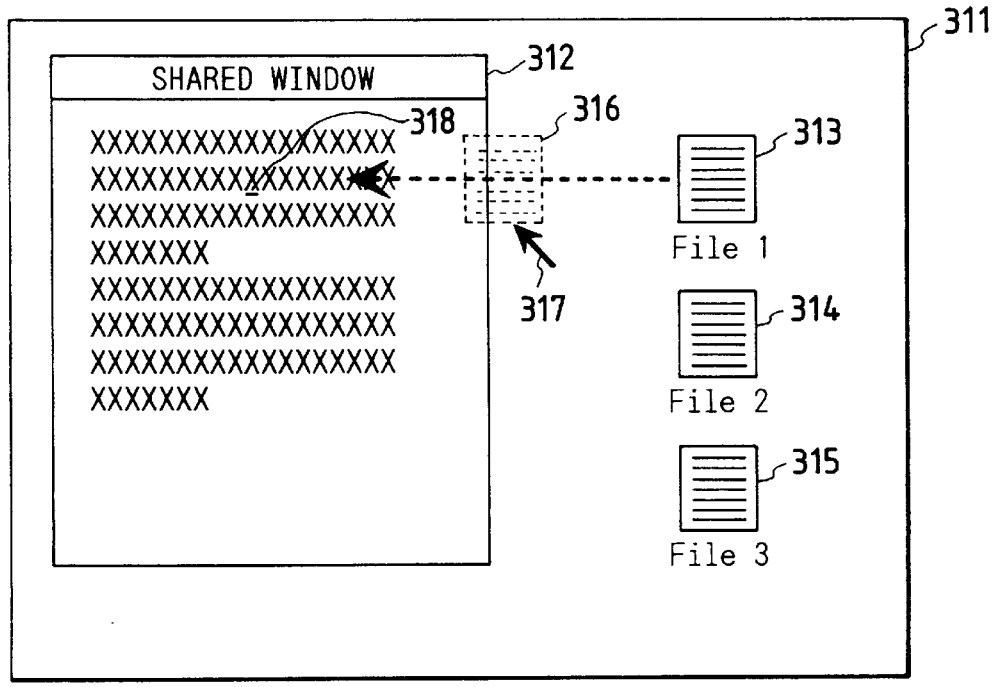
FIGS. 12A and 12B are views showing display examples on a display screen before development of a text file.
Figure 12B:
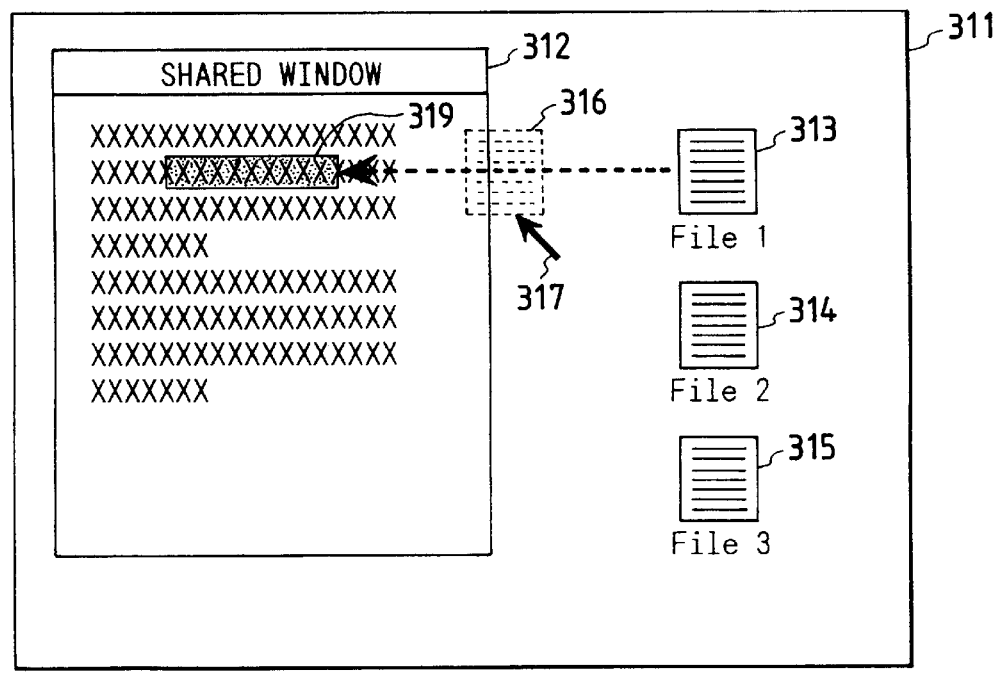

FIGS. 12A and 12B show display examples on the screen of the display unit 307 before development of a text file.

In FIGS. 12A and 12B, a shared window (shared screen) 312 for sharing a displayed text with a partner apparatus is displayed on a screen 311 of the display unit 307.

Also, file icons 313 to 315 are displayed on the screen 311, and correspond to various text files stored in the external memory apparatus 304 shown in FIG. 11. An icon 316 is being dragged, and is displayed during the drag operation (the mouse is moved while depressing a mouse button).

A pointer 317 is also displayed on the screen 311. The pointer 317 arbitrarily moves on the display screen 311 in response to the operation of the operation unit 305 such as the mouse, keyboard, and the like. The pointer 317 indicates the operation position upon execution of various operations using the operation unit 305. A cursor 318 is displayed by the click operation (by depressing the mouse button for a short period of time), and a hatching 319 is displayed in the shared window 312 by the drag operation.

As shown in FIG. 12A, when a text in a file stored in the external memory apparatus 304 is to be developed on the shared window 312, the pointer 317 is moved to a position, where the text is to be developed, in the shared window 312, and the mouse button is clicked there to display the cursor 318.

For example, when a file corresponding to the file icon 313 is to be developed in the shared window 312, the pointer 317 is moved to a position on the file icon 313, and the drag operation is started. When the drag operation is started, the drag icon 316 is being displayed at the position of the moving pointer 317.

When the pointer 317 is moved to the position of the cursor 318, and the drop operation (the mouse button is released after the drag operation) is performed, the contents of the file corresponding to the file icon 313 selected by the drag operation are inserted before the position of the cursor 318.

When the drop operation is performed, the file icon 313 as a drag source remains displayed, and the contents of the file corresponding to the file icon 313 remain stored, but the display of the drag icon 316 on the shared window 312 disappears.

The development position of a text can also be designated by displaying the hatching 319, as shown in FIG. 12B. In this case, the pointer 317 is moved to a range, where the text is to be developed, in the shared window 312, and the drag operation is performed there to display the hatching 319.

When the file icon 313 is dragged and dropped at the position of the hatching 319 in the same manner as the above-mentioned operation, the contents of the text in the range of the hatching 319 are replaced by the contents of the file corresponding to the file icon 313 selected by the drag operation.

Figure 13:
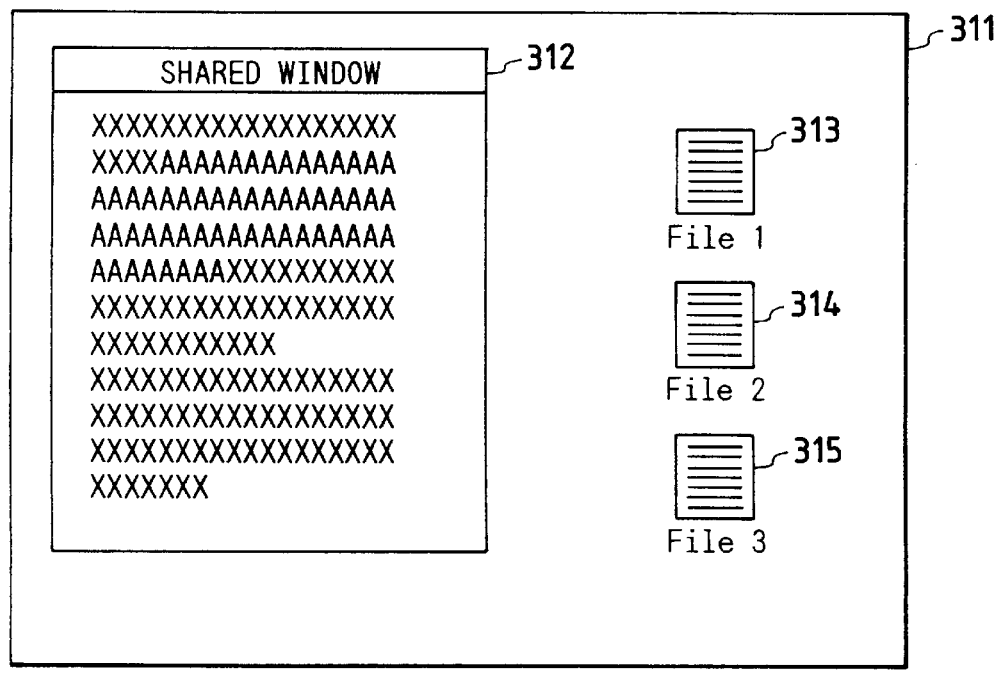
FIG. 13 is a view showing a display example on the display screen after development of a text file.

FIG. 13 shows a display example on the screen of the display unit 307 after the above-mentioned file development.

As has been described above with reference to FIGS. 12A and 12B, when the file icon 313 is dropped on the cursor 318, the contents of a file corresponding to the file icon 313 are inserted before the position of the cursor 318. On the other hand, when the dragged file icon 313 is dropped on the hatching 319, the contents of the text within the range of the hatching 319 are replaced by the contents of the file corresponding to the file icon 313.

As a result, the text developed on the shared window 312 is modified, as shown in FIG. 13. In FIG. 13, an original text before development is indicated by "XXX . . . XXX", and a file inserted or replaced by development is indicated by "AAA . . . AAA".

Information of the development position or range (the position of the cursor 318 or the range of the hatching 319) of the text designated by the operation unit 305, as described above, and the text of the file corresponding to the designated file icon 313 are transmitted from the line control unit 308 to a partner apparatus via the line 309.

On the other hand, in a receiving apparatus connected to the above-mentioned transmitting apparatus via the line 309, the shared window 312 similar to the partner apparatus is displayed on the display screen 311. In this case, the file icons 313 to 315 are not always displayed.

When the line control unit 308 of the receiving apparatus receives the information of the development position or range of the text and the text in the file, the same text "AAA . . . AAA" is displayed at the same position as the development position in the shared window 312 of the transmitting apparatus.

Figure 14:
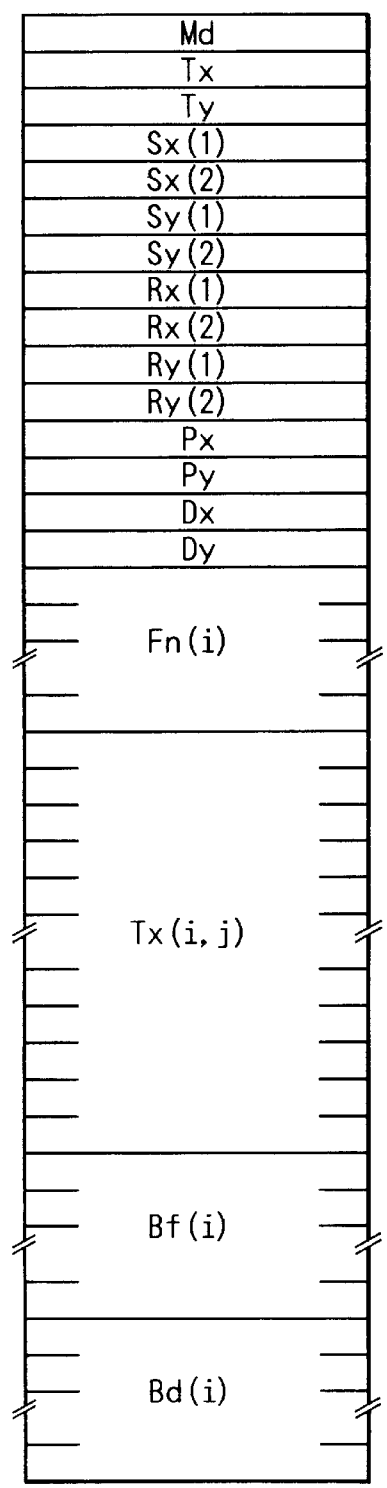
FIG. 14 shows the memory map on a RAM.

FIG. 14 shows the memory map on the RAM 303 in this embodiment.

Referring to FIG. 14, a variable Md stores the operation mode ("range designation" or "text development") of the drag operation, a variable Tx stores the distance from the left end of the shared window 312 to the pointer 317 in units of characters, and a variable Ty stores the distance from the upper end of the shared window 312 to the pointer 317 in units of characters.

An array Sx(1) stores the distance from the left end of the shared window 312 to the cursor 318 or the start position of the hatching 319 in units of characters, and an array Sx(2) stores the distance from the left end of the shared window 312 to the end position of the hatching 319 in units of characters (it is set to be zero when the cursor 318 is displayed).

An array Sy(1) stores the distance from the upper end of the shared window 312 to the cursor 318 or the start position of the hatching 319 in units of characters, and an array Sy(2) stores the distance from the upper end of the shared window 312 to the end position of the hatching 319 in units of characters (it is set to be zero when the cursor 318 is displayed).

A variable Rx(1) stores the value of a storage field Cx(1) in the received array Sx(1), a variable Rx(2) stores the value of a storage field Cx(2) in the received array Sx(2), a variable Ry(1) stores the value of a storage field Cy(1) in the received array Sy(1), and a variable Ry(2) stores the value of a storage field Cy(2) in the received array Sy(2). Note that the storage fields Cx(1), Cx(2), Cy(1), and Cy(2) will be described later.

A variable Px stores the distance from the left end of the display screen 311 to the pointer 317 in units of pixels, a variable Py stores the distance from the upper end of the display screen 311 to the pointer 317 in units of pixels, a variable Dx stores the distance from the left end of the display screen 311 to the drag icon 316 in units of pixels, and a variable Dy stores the distance from the upper end of the display screen 311 to the drag icon 316 in units of pixels.

An array Fn(i) stores the file name of a file to be developed, an array Tx(i,j) stores a text displayed in the shared window 312 (i is the column number, and j is the row number), an array Bf(i) stores the bit maps of the file icons 313 to 315, and an array Bd(i) stores the bit map of the drag icon 316.

Upon start of the apparatus of this embodiment, assume that the array Bf(i) is initialized by the bit maps of the file icons 313 to 315, and the array Bd(i) is initialized by the bit map of the drag icon 316. These pieces of initialized bit map information are supplied to the display control unit 306 when the icons 313 to 316 are displayed.

FIG. 15 shows the format of a packet of a text file to be transmitted from the line control unit 308.

Referring to FIG. 15, a field Lp stores the length of the packet, a field Cm stores the type of a command, a field Cx(1) stores the value of the array Sx(1), a field Cx(2) stores the value of the array Sx(2), a field Cy(1) stores the value of the array Sy(1), a field Cy(2) stores the value of the array Sy(2), and a field T(i) stores the text in the file Fn(i).

FIGS. 16 to 20 are flow charts showing the processes of the program stored in the ROM 302 shown in FIG. 11, which are started by the CPU 301 when corresponding events are generated upon development of a text.

Figure 16:
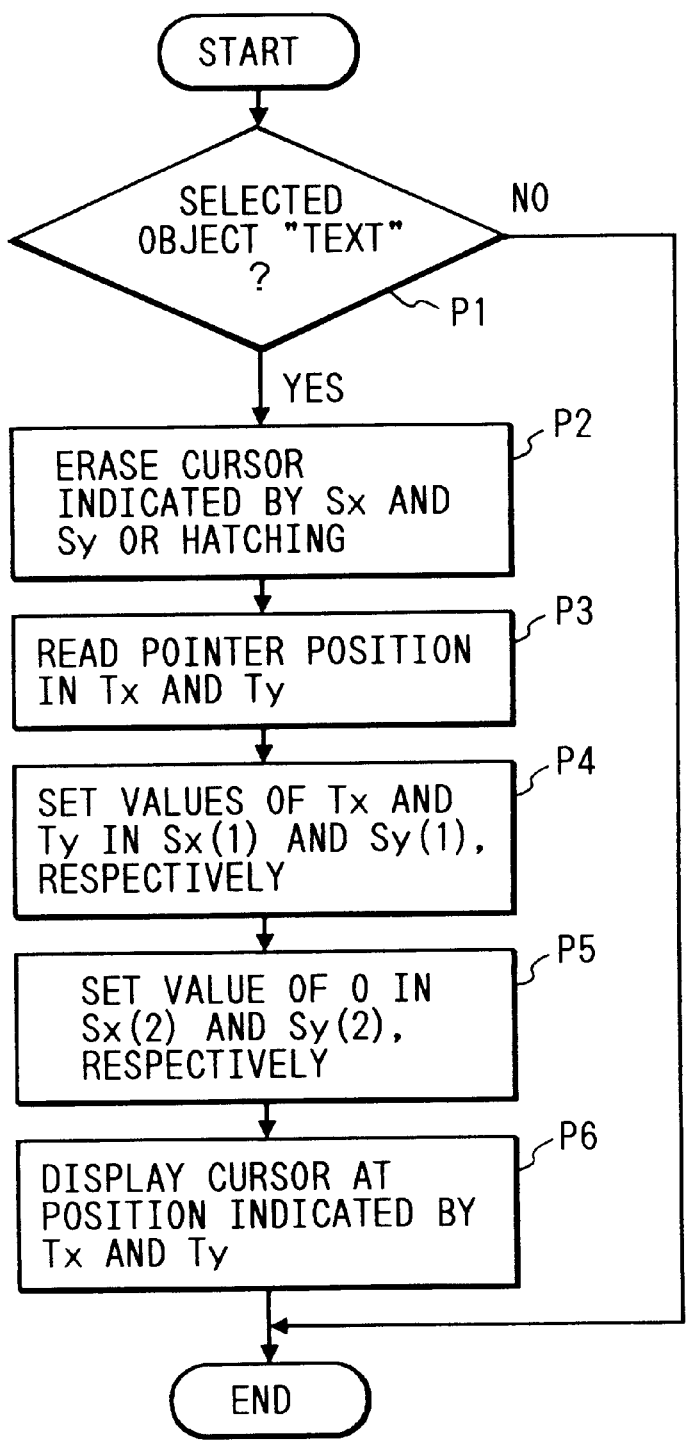
FIG. 16 is a flow chart showing the processing started upon clicking of a mouse button.

FIG. 16 is a flow chart showing the process started when the mouse button is clicked. More specifically, this flow chart shows the process when the drag icon 316 in FIG. 12A is displayed.

Referring to FIG. 16, it is checked in step P1 if the type of a currently selected object read from the display control unit 306 is "text". If YES in step P1, the flow advances to step P2; otherwise, the process ends.

In step P2, the CPU 301 instructs the display control unit 306 to erase the display of the cursor 318 or the hatching 319 indicated by the arrays Sx(1), Sx(2), Sy(1), and Sy(2). This is to erase the already displayed cursor 318 or hatching 319.

In step P3, the CPU 301 reads the position information of the pointer 317 from the display control unit 306 into the variables Tx and Ty in units of characters. In step P4, the CPU 301 respectively sets the values of the variables Tx and Ty in the arrays Sx(1) and Sy(1). In step P5, the CPU 301 sets the arrays Sx(2) and Sy(2) to be zero. In step P6, the CPU 301 instructs the display control unit 306 to display the cursor 318 at the position represented by the variables Tx and Ty, i.e., the position designated by the click operation.

Figure 17:
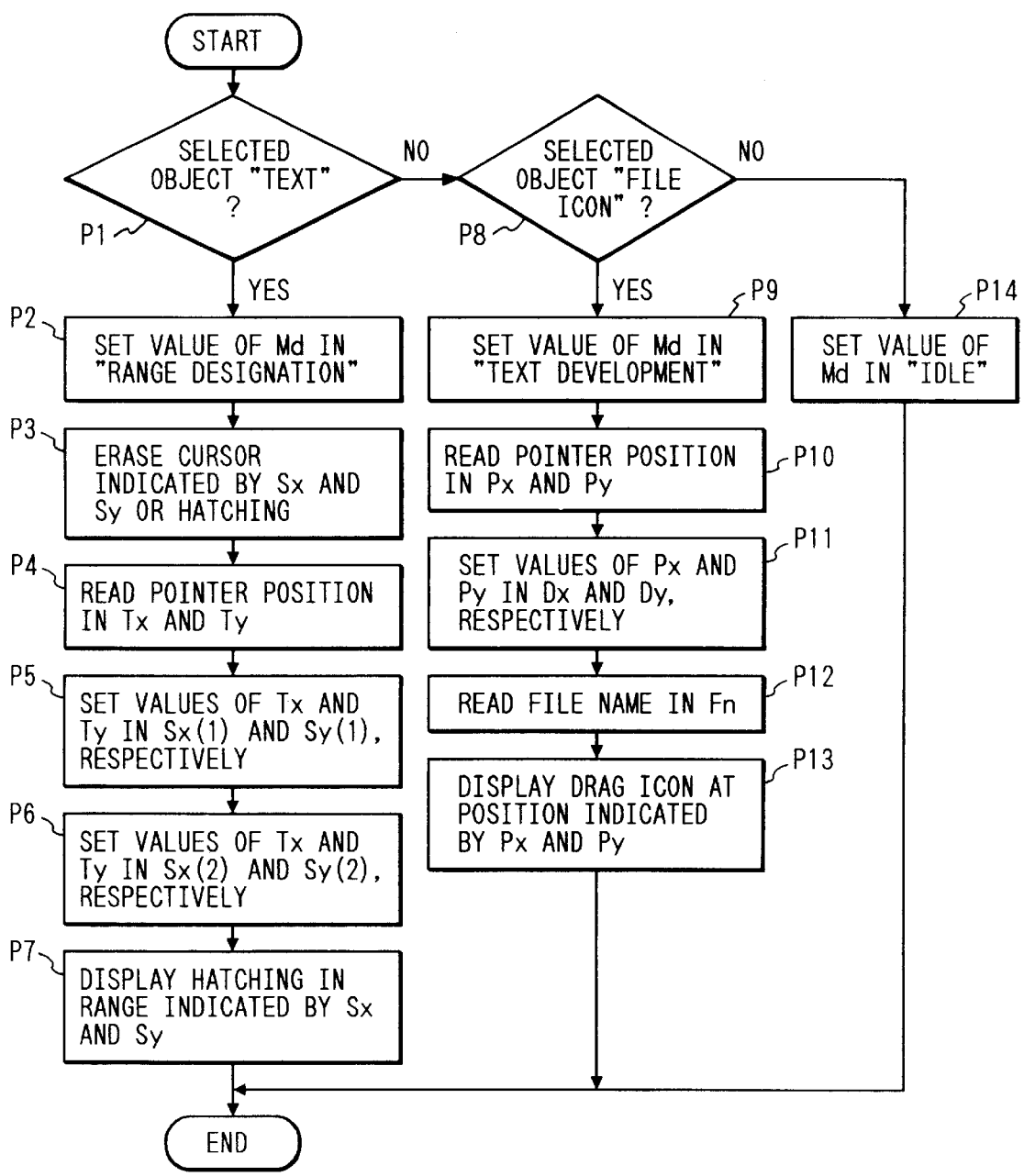
FIG. 17 is a flow chart showing the processing started at the beginning of the drag operation of a mouse.

FIG. 17 is a flow chart showing the process started at the beginning of the drag operation of the mouse. More specifically, the processes in steps P1 to P7 in FIG. 17 are executed to designate the start position of the hatching in FIG. 12B, and the processes in steps P8 to P13 are performed to select a desired file icon from the file icons 313 to 315 shown in FIGS. 12A and 12B.

Referring to FIG. 17, it is checked in step P1 if the type of a currently selected object read from the display control unit 306 is "text". If YES in step P1, the flow advances to step P2; otherwise, the flow advances to step P8.

In step P2, the CPU 301 sets the variable Md to be a value representing "range designation". Subsequently, the CPU 301 instructs the display control unit 306 to erase the display of the cursor 318 or the hatching 319 at the position indicated by the arrays Sx(1), Sx(2), Sy(1), and Sy(2) in step P3.

In step P4, the CPU 301 reads the position information of the pointer 317 from the display control unit 306 into the variables Tx and Ty in units of characters. The CPU 301 respectively sets the values of the variables Tx and Ty in the arrays Sx(1) and Sy(1) in step P5, and respectively sets the values of the variables Tx and Ty in the arrays Sx(2) and Sy(2) in step P6.

Thereafter, the CPU 301 instructs the display control unit 306 to display the hatching 319 in the range indicated by the arrays Sx(1), Sx(2), Sy(1), and Sy(2), i.e., in the range designated by the drag operation in step P7, and ends the process. In this case, since Sx(1)=Sx(2) and Sy(1)=Sy(2), the hatching 319 is displayed as a dot.

On the other hand, it is checked in step P8 if the type of a currently selected object read from the display control unit 306 is "file icon". If YES in step P8, the flow advances to step P9; otherwise, the flow advances to step P14.

In step P9, the CPU 301 sets the value of the variable Md to be a value representing "text development". In step P10, the CPU 301 reads the position information of the pointer 317 from the display control unit 306 into the variables Px and Py in units of pixels. In step P11, the CPU 301 respectively sets the values of the variables Px and Py in the variables Dx and Dy.

In step P12, the CPU 301 reads the file name of a file to be developed from the display control unit 306 into the array Fn(i). In step P13, the CPU 301 instructs the display control unit 306 to display the drag icon 316 at the position indicated by the variables Px and Py, i.e., the position where the pointer 317 is located, thus ending the process.

If the flow advances from step P8 to step P14, the CPU 301 sets the value of the variable Md to be a value corresponding to "idle" representing a state wherein neither "range designation" nor "text development" are performed, thus ending the process.

Figure 18:
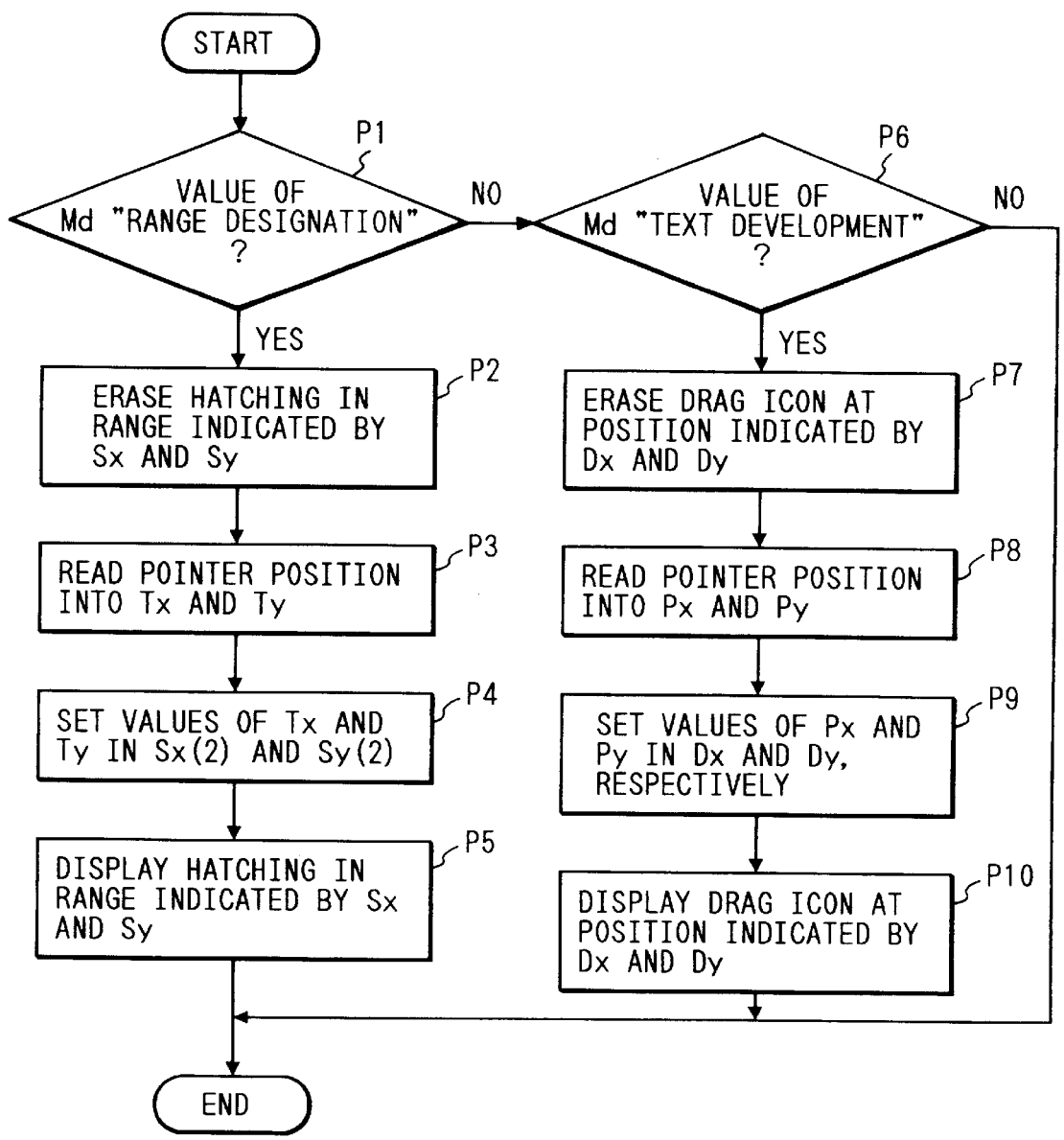
FIG. 18 is a flow chart showing the processing started during the drag operation of the mouse.

FIG. 18 is a flow chart showing the process started while the mouse is dragged. More specifically, the processes in steps P1 to P5 in FIG. 18 correspond to those during designation of the range of the hatching 319 in FIG. 12B, and the processes in steps P6 to P10 correspond to those during movement of the drag icon 316 shown in FIGS. 12A and 12B.

Referring to FIG. 18, it is checked in step P1 if the value of the variable Md is a value representing "range designation". If YES in step P1, the flow advances to step P2; otherwise, the flow advances to step P6.

In step P2, the CPU 301 instructs the display control unit 306 to erase the display of the hatching 319 within the range indicated by the current values of the arrays Sx(1), Sx(2), Sy(1), and Sy(2). In step P3, the CPU 301 reads the position information of the pointer 317 from the display control unit 306 into the variables Tx and Ty in units of characters.

In step P4, the CPU 301 respectively sets the values of the variables Tx and Ty in the arrays Sx(2) and Sy(2). In step P5, the CPU 301 instructs the display control unit 306 to display the hatching 319 within the range indicated by the new values (the values of the arrays Sx(1) and Sy(1) indicating the start point of the hatching 319 remain the same) of the arrays Sx(1), Sx(2), Sy(1), and Sy(2) which are set in the above steps, thus ending the process.

On the other hand, if the flow advances from step P1 to step P6, it is checked if the variable Md is set to be a value representing "text development". If YES in step P6, the flow advances to step P7; otherwise, the process ends.

In step P7, the CPU 301 instructs the display control unit 306 to erase the display of the drag icon 316 located at the position indicated by the current values of the variables Dx and Dy. Subsequently, the CPU 301 reads the position information of the pointer 317 from the display control unit 306 into the variables Px and Py in units of pixels in step P8.

In step P9, the CPU 301 respectively sets the values of the variables Px and Py in the variables Dx and Dy. In step P10, the CPU 301 instructs the display control unit 306 to display the drag icon 316 at the position indicated by the new values of the variables Dx and Dy set in the above step, thus ending the process.

Figure 19:
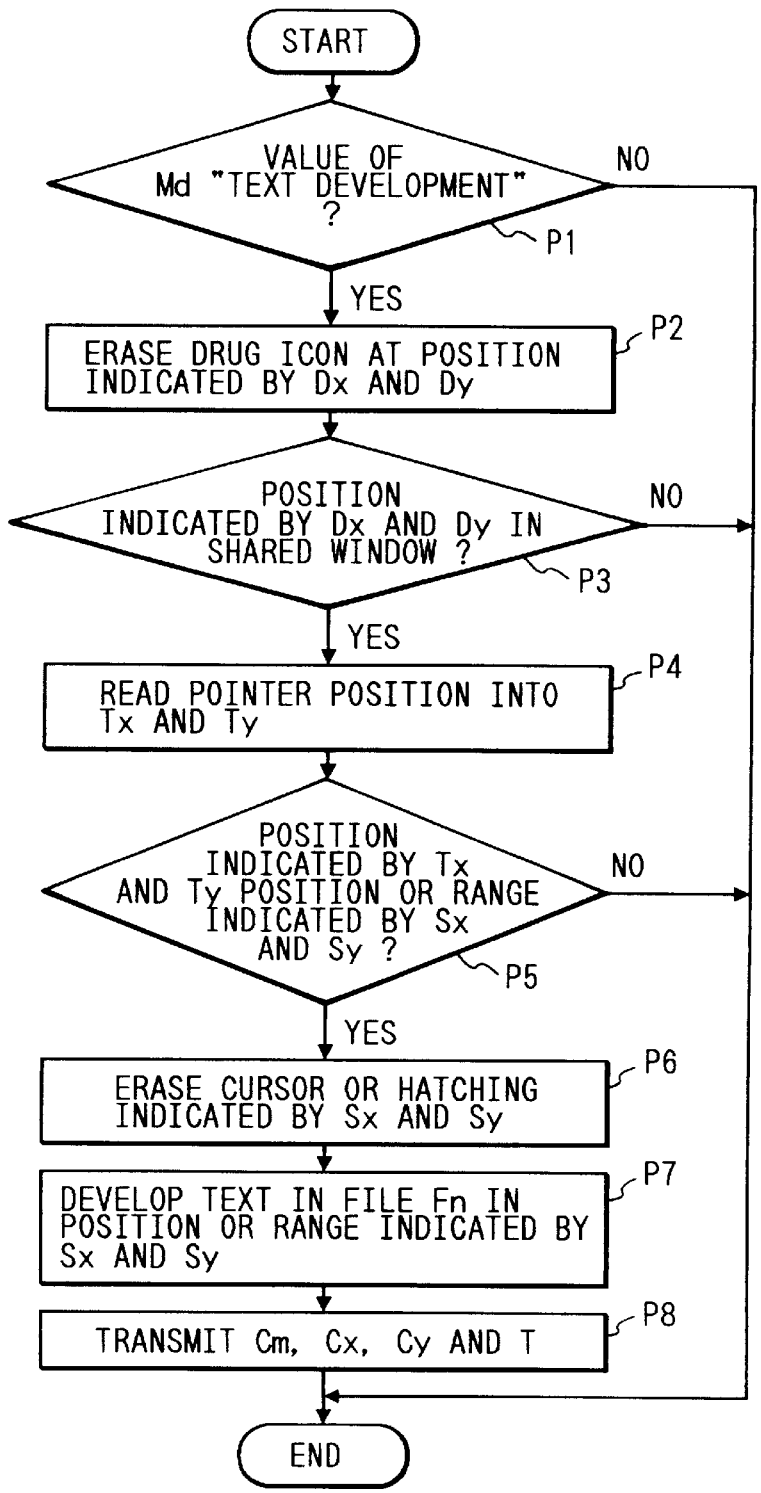
FIG. 19 is a flow chart showing the processing started upon the drop operation of the mouse.

FIG. 19 is a flow chart showing the process started upon the drop operation of the mouse.

Referring to FIG. 19, it is checked in step P1 if the variable Md is set to be a value representing "text development". If YES in step P1, the flow advances to step P2; otherwise, the process ends.

In step P2, the CPU 301 instructs the display control unit 306 to erase the display of the drag icon 316 located at the position indicated by the variables Dx and Dy. Subsequently, the CPU 301 checks in step P3 if the position indicated by the variables Dx and Dy falls within the shared window 312. If YES in step P3, the flow advances to step P4; otherwise, the process ends.

In this step, the CPU 301 reads the position information of the shared window 312 from the display control unit 306 in units of pixels, and determines "within the shared window 312" if the read position information satisfies the following conditions:

Left End of Shared Window≦Dx≦Right End of Shared Window

Lower End of Shared Window≦Dy≦Upper End of Shared Window

In step P4, the CPU 301 reads the position information of the pointer 317 from the display control unit 306 into the variables Tx and Ty in units of characters. In step P5, the CPU 301 checks if the position indicated by the variables Tx and Ty corresponds to the position indicated by or a position within the range indicated by the arrays Sx(1), Sx(2), Sy(1), and Sy(2), i.e., the position of the cursor 318 or a position within the range of the hatching 319. If YES in step P5, the flow advances to step P6; otherwise, the process ends.

In this case, the CPU 301 reads the position information of the shared window 312 from the display control unit 306 in units of characters, and determines "the position of the cursor 318 or the position within the range of the hatching 319" if the read position information satisfies the following conditions:

When Sx(2)=0 and Sy(2)=0, Tx=Sx(1) and Ty=Sy(1)

When Sx(2)≉0 and Sy(2)≉0, and

When Ty=Sy(1), Sx(1)≦Tx≦Right End of Shared Window

When Sy(1)<Ty<Sy(2), Left End of Shared Window≦Tx≦Right End of Shared Window

When Ty=Sy(2), Left End of Shared Window≦Tx≦Sx(2)

In step P6, the CPU 301 instructs the display control unit 306 to erase the display of the cursor 318 or the hatching 319 at the position or within the range indicated by the arrays Sx(1), Sx(2), Sy(1), and Sy(2). In step P7, the CPU 301 develops a text in the file Fn(i) at the position or within the range indicated by the arrays Sx(1), Sx(2), Sy(1), and Sy(2).

In this case, when Sx(2)=0 and Sy(2)=0, the text in the file Fn(i) is inserted at the position indicated by the variables Tx and Ty. On the other hand, when Sx(2)≉0 and Sy(2)≉0, a text within the range indicated by the arrays Sx(1), Sx(2), Sy(1), and Sy(2) is replaced by the text in the file Fn(i).

In step P8, the CPU 301 stores a text development command in the field Cm, respectively stores the values of the arrays Sx(1), Sx(2), Sy(1), and Sy(2) in the fields Cx(1), Cx(2), Cy(1), and Cy(2), and stores the text in the file Fn(i) in the field T(i). Then, the CPU 301 transmits these pieces of field information to a partner apparatus via the line control unit 308, thus ending the process.

Figure 20:
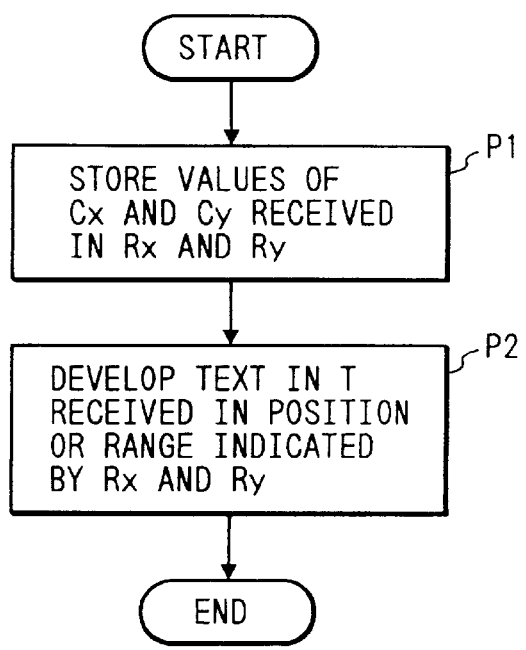
FIG. 20 is a flow chart showing the processing started upon reception of a packet including a text development command.

FIG. 20 is a flow chart showing the process started when the line control unit 308 receives a packet including a text development command in the field Cm.

In step P1, the CPU 301 respectively sets the information of the fields Cx(1), Cx(2), Cy(1), and Cy(2) received from the line control unit 308 in the arrays Rx(1), Rx(2), Ry(1), and Ry(2). In step P2, the CPU 301 develops the information of the field T(i) received from the line control unit 308 at the position or within the range indicated by the arrays Rx(1), Rx(2), Ry(1), and Ry(2), thus ending the process.

As described above, in this embodiment, by performing the drag & drop operation of the file icon displayed on the display screen 311, the text in the file corresponding to the file icon 313 can be developed on the shared window 312 and can be transmitted to a partner apparatus. As a result, a text can be easily written in the shared window 312.

In the fifth embodiment described above, the designated range of the text is indicated by the hatching 319. Alternatively, the designated range of the text may be indicated by an underline, bold or italic characters, or the like.

Sixth Embodiment

As the sixth embodiment, a case will be exemplified wherein an image in a file is developed on the shared window.

Note that the arrangement of the communication apparatus of this embodiment is the same as that shown in FIG. 11.

Figure 21A:
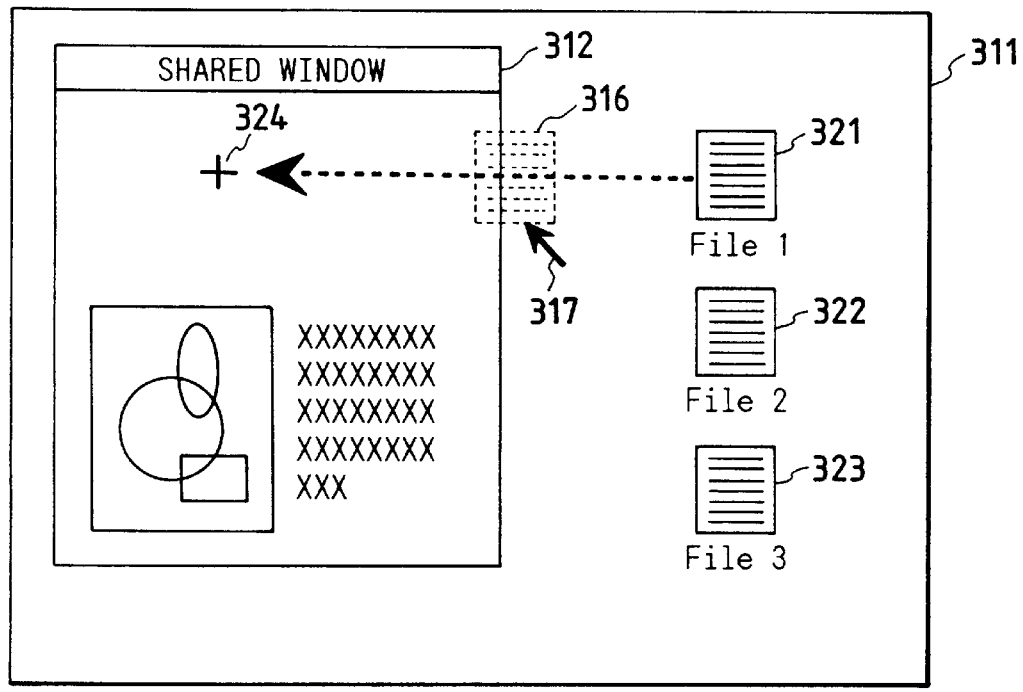
FIGS. 21A and 21B are views showing display examples on the display screen before development of an image file.
Figure 21B:
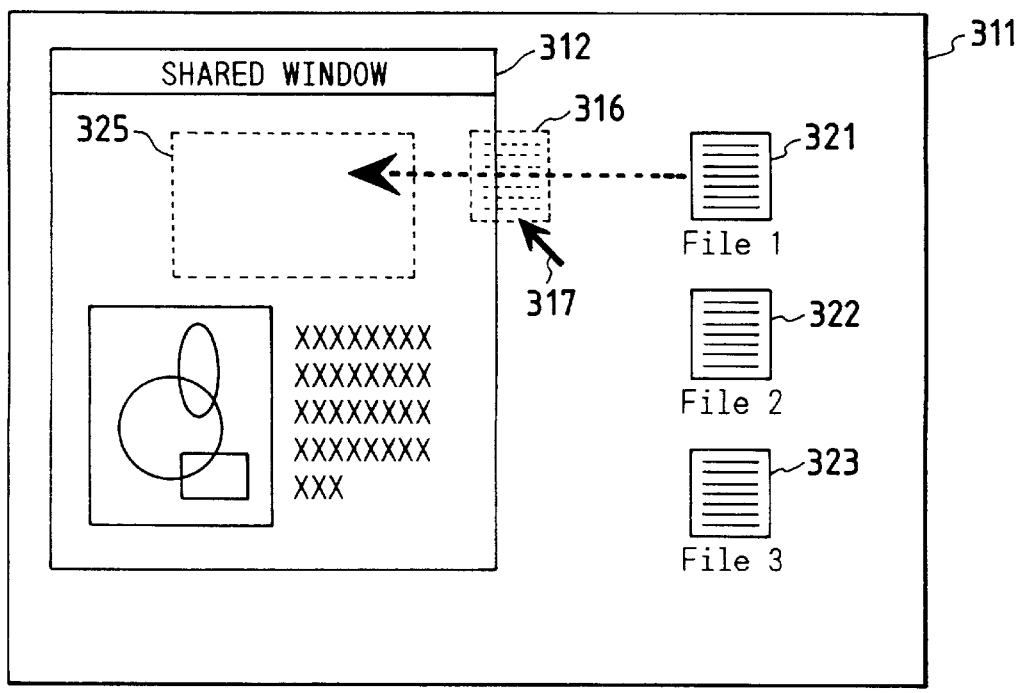

FIGS. 21A and 21B show display examples on the screen of the display unit 307 before development of an image file. The same reference numerals in FIGS. 21A and 21B denote the same parts as in FIGS. 12A and 12B.

Referring to FIGS. 21A and 21B, file icons 321 to 323 correspond to various image files stored in the external memory apparatus 304 shown in FIG. 11.

A cursor 324 is displayed by the click operation of the mouse button, and has a shape different from the cursor 318 (see FIG. 12A) displayed upon development of the text file. A frame 325 is displayed in the shared window 312 by the drag operation of the mouse.

As shown in FIG. 21A, when an image in files stored in the external memory apparatus 304 is to be displayed in the shared window 312, the pointer 317 is moved to a position, where an image is to be displayed, in the shared window 312, and the mouse button is clicked there to display the cursor 324.

For example, when an image in a file corresponding to the file icon 321 is to be displayed in the shared window 312, the pointer 317 is moved to a position on the file icon 321, and the drag operation is started. When the drag operation is started, the drag icon is displayed at the position of the moving pointer 317 during the drag operation.

Thereafter, when the pointer 317 is moved to the position of the cursor 324 and the drop operation is performed, the image in the file corresponding to the file icon 321 selected by the drag operation is displayed at the position of the cursor 324.

When the drop operation is performed, the file icon 321 as a drag source remains displayed, and the contents of the file corresponding to the file icon 321 remain stored, but the display of the drag icon 316 on the shared window 312 disappears.

The display position of an image can also be designated by displaying the frame 325, as shown in FIG. 21B. More specifically, the pointer 317 is moved to a range, where an image is to be displayed, in the shared window 312, and the drag operation of the mouse is performed there to display the frame 325. In this case, the drag operation is performed in the diagonal direction of the frame 325.

When the file icon 321 is dragged and dropped at the position of the frame 325 in the same manner as the above-mentioned operation, an image corresponding to the file icon 321 selected by the drag operation is displayed in the range of the frame 325.

Figure 22:
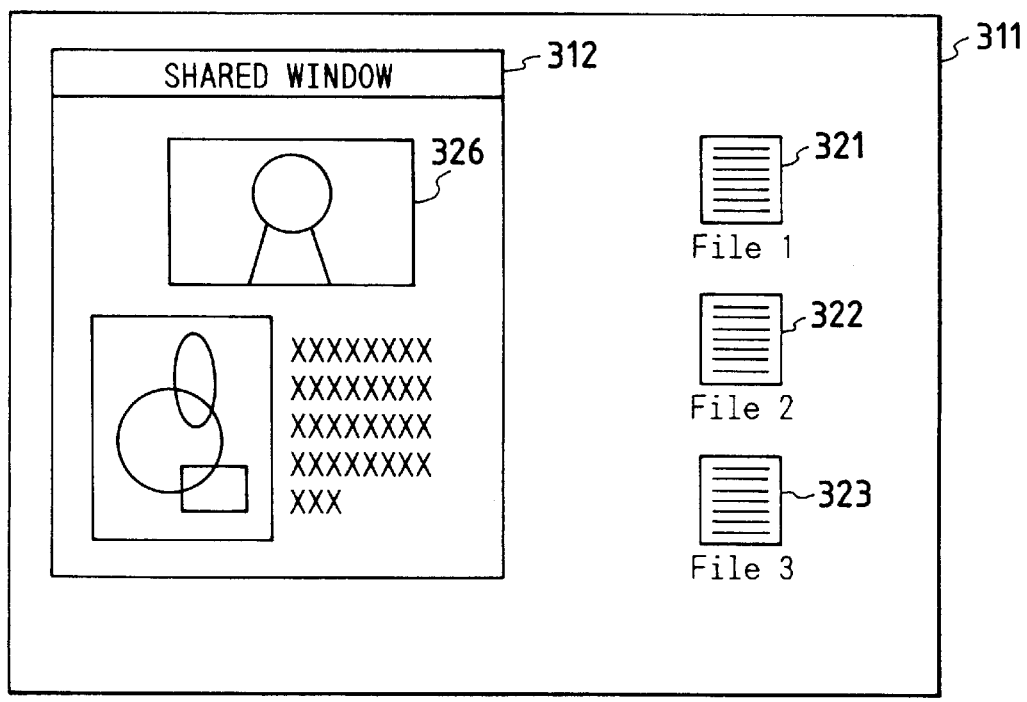
FIG. 22 is a view showing a display example on the display screen after development of an image file.

FIG. 22 shows a display example on the screen of the display unit 307 after development of the file.

As shown in FIG. 22, when the file icon 321 is dropped on the cursor 324 or the frame 325, an image 326 corresponding to the file icon 321 is displayed at the position of the cursor 324 or within the range of the frame 325.

Information of the display position or range (the position of the cursor 324 or the range of the frame 325) of an image designated by the operation unit 305 as described above, and image data in a file corresponding to the designated file icon 321 are transmitted from the line control unit 308 to a partner apparatus via the line 309.

On the other hand, in a receiving apparatus connected to the above-mentioned transmitting apparatus via the line 309, the shared window 312 similar to the partner apparatus is displayed on the display screen 311. In this case, the file icons 321 to 323 are not always displayed.

When the line control unit 308 of the receiving apparatus receives information of the display position or range of an image and image data in a file, the image 326 is displayed at the same position or in the same range as that in the shared window 312 of the transmitting apparatus.

Figure 23:
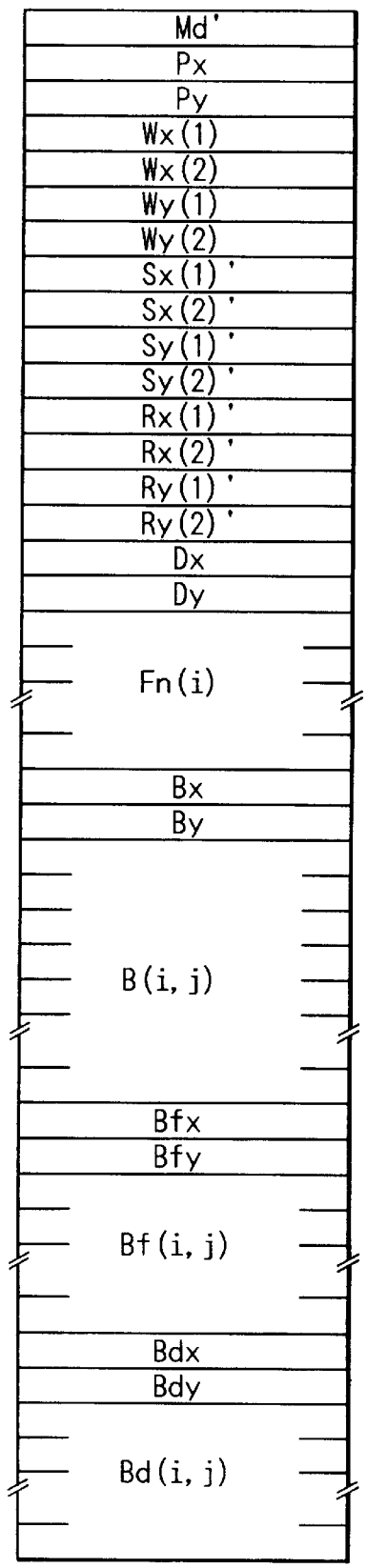
FIG. 23 shows the memory map on the RAM.

FIG. 23 shows the memory map on the RAM 303 in this embodiment.

Note that the same reference symbols in FIG. 23 denote variables or arrays with the same contents as those in the memory map shown in FIG. 14.

A variable Md' stores an operation mode ("range designation" or "image development") of the drag operation.

An array Wx(1) stores the distance from the left end of the display screen 311 to the left end of the shared window 312 in units of pixels, an array Wx(2) stores the distance from the left end of the display screen 311 to the right end of the shared window 312 in units of pixels, an array Wy(1) stores the distance from the upper end of the display screen 311 to the upper end of the shared window 312 in units of pixels, and an array Wy(2) stores the distance from the upper end of the display screen 311 to the lower end of the shared window 312 in units of pixels.

An array Sx(1)' stores the distance from the left end of the shared window 312 to the cursor 324 or the left end of the frame 325 in units of pixels, and an array Sx(2)' stores the distance from the left end of the shared window 312 to the right end of the frame 325 in units of pixels (it is set to be zero when the cursor 324 is displayed).

An array Sy(1)' stores the distance from the upper end of the shared window 312 to the cursor 324 or the left end of the frame 325 in units of pixels, and an array Sy(2)' stores the distance from the upper end of the shared window 312 to the right end of the frame 325 in units of pixels (it is set to be zero when the cursor 324 is displayed).

A variable Rx(1)' stores the value of a storage field Fx(1) of the received array Sx(1)', a variable Rx(2)' stores the value of a storage field Fx(2) of the received array Sx(2)', a variable Ry(1)' stores the value of a storage field Fy(1) of the received array Sy(1)', and a variable Ry(2)' stores the value of a storage field Fy(2) of the received array Sy(2)'. Note that the storage fields Fx(1), Fx(2), Fy(1), and Fy(2) will be described later.

A variable Bx stores the number of pixels, in the horizontal direction, of the image 326 in the file to be displayed in the shared window 312, a variable By stores the number of pixels, in the vertical direction, of the image 326 in the file to be displayed in the shared window, and an array B(i,j) stores the bit map of the image 326 in the file to be displayed in the shared window 312 (i is the pixel number in the horizontal direction, and j is the pixel number in the vertical direction).

A variable Bfx stores the number of pixels, in the horizontal direction, of images of the file icons 321 to 323, a variable Bfy stores the number of pixels, in the vertical direction, of the images of the file icons 321 to 323, and an array Bf(i,j) stores the bit maps of the images of the file icons 321 to 323 (i is the pixel number in the horizontal direction, and j is the pixel number in the vertical direction).

A variable Bdx stores the number of pixels, in the horizontal direction, of an image of the drag icon 316, a variable Bdy stores the number of pixels, in the vertical direction, of the image of the drag icon 316, and an array Bd(i,j) stores the bit map of the image of the drag icon 316 (i is the pixel number in the horizontal direction, and j is the pixel number in the vertical direction).

Assume that when the apparatus of this embodiment is started, the variable Bfx is initialized by the number of pixels, in the horizontal direction, of the images of the file icons 321 to 323, the variable Bfy is initialized by the number of pixels, in the vertical direction, of the images of the file icons 321 to 323, and the array Bf(i,j) is initialized by the bit maps of the images of the file icons 321 to 323.

Also, assume that the variable Bdx is initialized by the number of pixels, in the horizontal direction, of the image of the drag icon 316, the variable Bdy is initialized by the number of pixels, in the vertical direction, of the image of the drag icon 316, and the array Bd(i,j) is initialized by the bit map of the image of the drag icon 316.

These initialized variables and arrays are supplied to the display control unit 306 when the icons are displayed.

When the shared window 312 is displayed, the arrays Wx and Wy are initialized by the position of the shared window 312 in the display screen 311.

FIG. 24 shows the format of a packet of an image file transmitted from the line control unit 308.

Referring to FIG. 24, a field Lp stores the length of the packet, a field Cm stores the type of a command, a field Fx(1) stores the value of the array Sx(1)', a field Fx(2) stores the value of the array Sx(2)', a field Fy(1) stores the value of the array Sy(1)', a field Fy(2) stores the value of the array Sy(2)', and a field Bm(i,j) stores the bit map of the displayed image 326 in the file (i is the pixel number in the horizontal direction, and j is the pixel number in the vertical direction).

FIGS. 25 to 29 are flow charts showing the processes of the program stored in the ROM 302, which are started by the CPU 301 when corresponding events are generated upon development of an image.

FIG. 25 is a flow chart showing the process started when the mouse button is clicked. More specifically, this flow chart shows the processes executed when the cursor 324 shown in FIG. 21A is displayed.

Referring to FIG. 25, it is checked in step P1 if the type of a currently selected object read from the display control unit 306 is "shared window". If YES in step P1, the flow advances to step P2; otherwise, the processing ends.

The processes in steps P2 to P6 are substantially the same as those in steps P2 to P6 shown in FIG. 16, except that the variables Tx and Ty and the arrays Sx(1), Sx(2), Sy(1), and Sy(2) in units of characters are used in the flow chart in FIG. 16 since a text is to be processed, while the variables Px and Py and the arrays Sx(1)', Sx(2)1, Sy(1)', and Sy(2)' in units of pixels are used in this embodiment since an image is to be processed. Therefore, a detailed description of the process contents will be omitted here.

Figure 26:
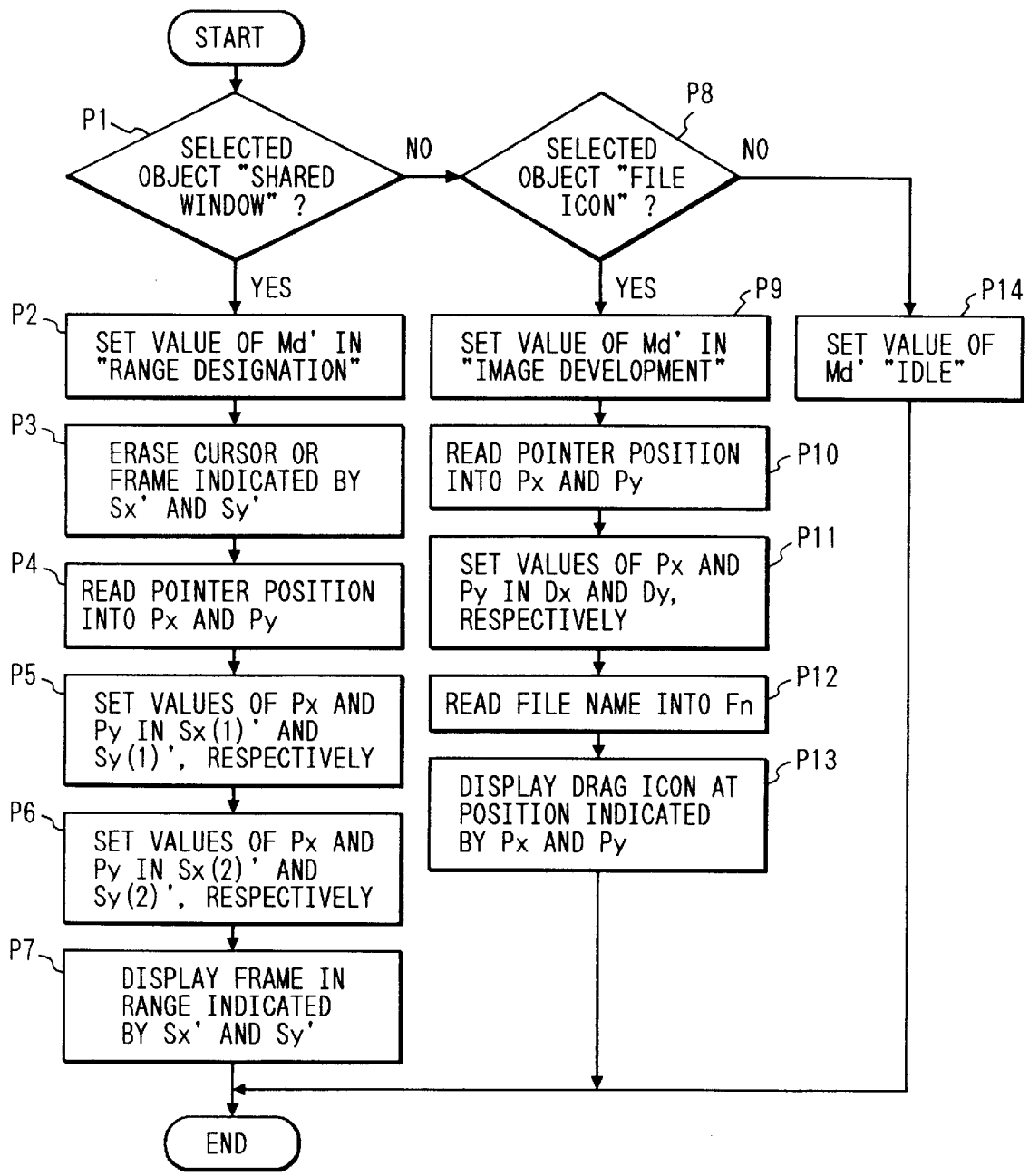
FIG. 26 is a flow chart showing the processing started at the beginning of the drag operation of a mouse.

FIG. 26 is a flow chart showing the process started at the beginning of the drag operation of the mouse. More specifically, the processes in steps P1 to P7 in FIG. 26 are those upon designation of the start position of the frame 325 shown in FIG. 21B, and the processes in steps P8 to P13 are those upon selection of a desired file icon from the file icons 321 to 323 shown in FIGS. 21A and 21B.

Referring to FIG. 26, it is checked in step P1 if the type of a currently selected object read from the display control unit 306 is a "shared window". If YES in step P1, the flow advances to step P2; otherwise, the flow advances to step P8.

In FIG. 26, the processes in steps P2 to P14 are substantially the same as those in steps P2 to P14 in FIG. 17, as in FIG. 25. More specifically, the difference between this embodiment and the flow chart in FIG. 17 is that in the former Md' is used as a variable for storing the operation mode of the drag operation, and the variables Px and Py and the arrays Sx(1)', Sx(2)', Sy(1)', and Sy(2)' in units of pixels are used. Therefore, a detailed description of the process contents will be omitted here.

Figure 27:
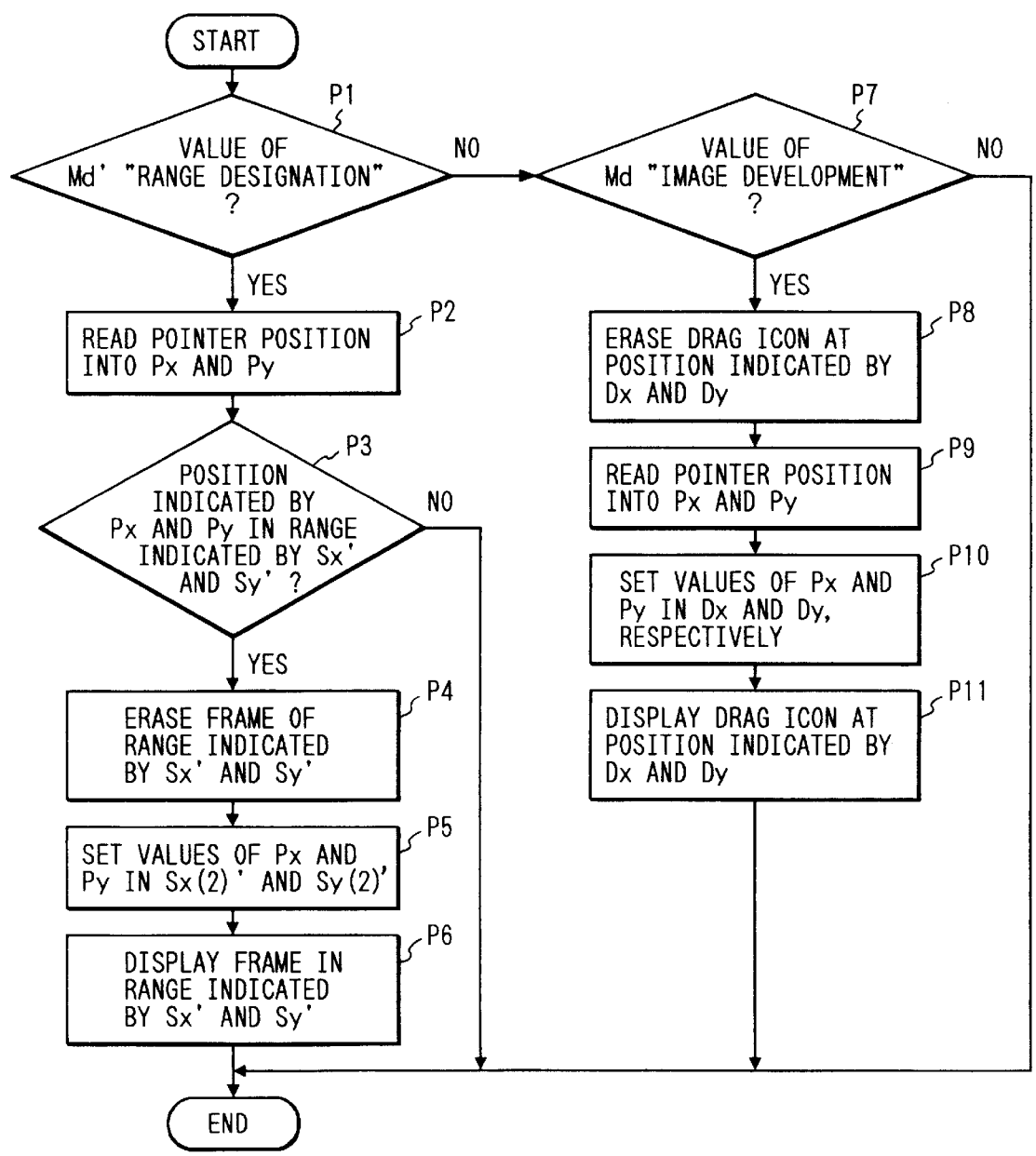
FIG. 27 is a flow chart showing the processing started during the drag operation of the mouse.

FIG. 27 is a flow chart showing the process started when the mouse is being dragged. More specifically, the processes in steps P1 to P6 in FIG. 27 correspond to those upon designation of the range of the frame 325 shown in FIG. 21B, and the processes in steps P7 to P11 correspond to those during movement of the drag icon 316 shown in FIGS. 21A and 21B.

Referring to FIG. 27, it is checked in step P1 if the variable Md' is set to be a value representing "range designation". If YES in step P1, the flow advances to step P2; otherwise, the flow advances to step P7.

In step P2, the CPU 301 reads the position information of the pointer 317 from the display control unit 306 into the variables Px and Py in units of pixels. In step P3, the CPU 301 checks if the position indicated by the read variables Px and Py corresponds to the position or a position within the range indicated by the arrays Sx(1)', Sx(2)', Sy(1)', and Sy(2)'. If YES in step P3, the flow advances to step P4; otherwise, the process ends.

Note that the CPU 301 determines "the position or the position within the range indicated by the arrays Sx(1)', Sx(2)', Sy(1)', and Sy(2)'" when the following conditions are satisfied:

When $Sx(1)' \leq Sx(2)'$ and $Sy(1)' \leq Sy(2)'$, $Wx(1)+Sx(1)' \leq Px \leq Wx(1)+Sx(2)'$ and $Wy(1)+Sy(1)' \leq Py \leq Wy(1)+Sy(2)'$ When $Sx(1)' > Sx(2)'$ and $Sy(1)' < Sy(2)'$, $Wx(1)+Sx(2)' \leq Px \leq Wx(1)+Sx(1)'$ and $Wy(1)+Sy(1)' \leq Py \leq Wy(1)+Sy(2)'$ When $Sx(1)' < Sx(2)'$ and $Sy(1)' > Sy(2)1$, $Wx(1)+Sx(1)' \leq Px \leq Wx(1)+Sx(2)'$ and $Wy(1)+Sy(2)' \leq Py \leq Wy(1)+Sy(1)'$ When $Sx(1)' > Sx(2)'$ and $Sy(1)' > Sy(2)'$, $Wx(1)+Sx(2)' \leq Px \leq Wx(1)+Sx(1)'$ and $Wy(1)+Sy(2)' \leq Py \leq Wy(1)+Sy(1)'$ In step P4, the CPU 301 instructs the display control unit 306 to erase the display of the frame 325 in the range indicated by the current values of the arrays Sx(1)', Sx(2)', Sy(1)', and Sy(2)'. Subsequently, in step P5, the CPU 301 respectively sets the values of the variables Px and Py in the arrays Sx(2)' and Sy(2)'.

In step P6, the CPU 301 instructs the display control unit 306 to display the frame 325 within the range indicated by the new values of the arrays Sx(1)', Sx(2)', Sy(1)', and Sy(2)' set in the above step, thus ending the process. Note that the frame 325 is displayed, so that line segments defined by the arrays Sx(1)', Sx(2)', Sy(1)', and Sy(2)' become diagonal lines.

On the other hand, if the flow advances from step P1 to step P7, it is checked if the variable Md' is set to be a value representing "image development". If YES in step P7, the flow advances to step P8; otherwise, the process ends. Since the processes in steps P8 to P11 are the same as those in steps P7 to P10 in the flow chart shown in FIG. 18, a detailed description thereof will be omitted.

Figure 28:
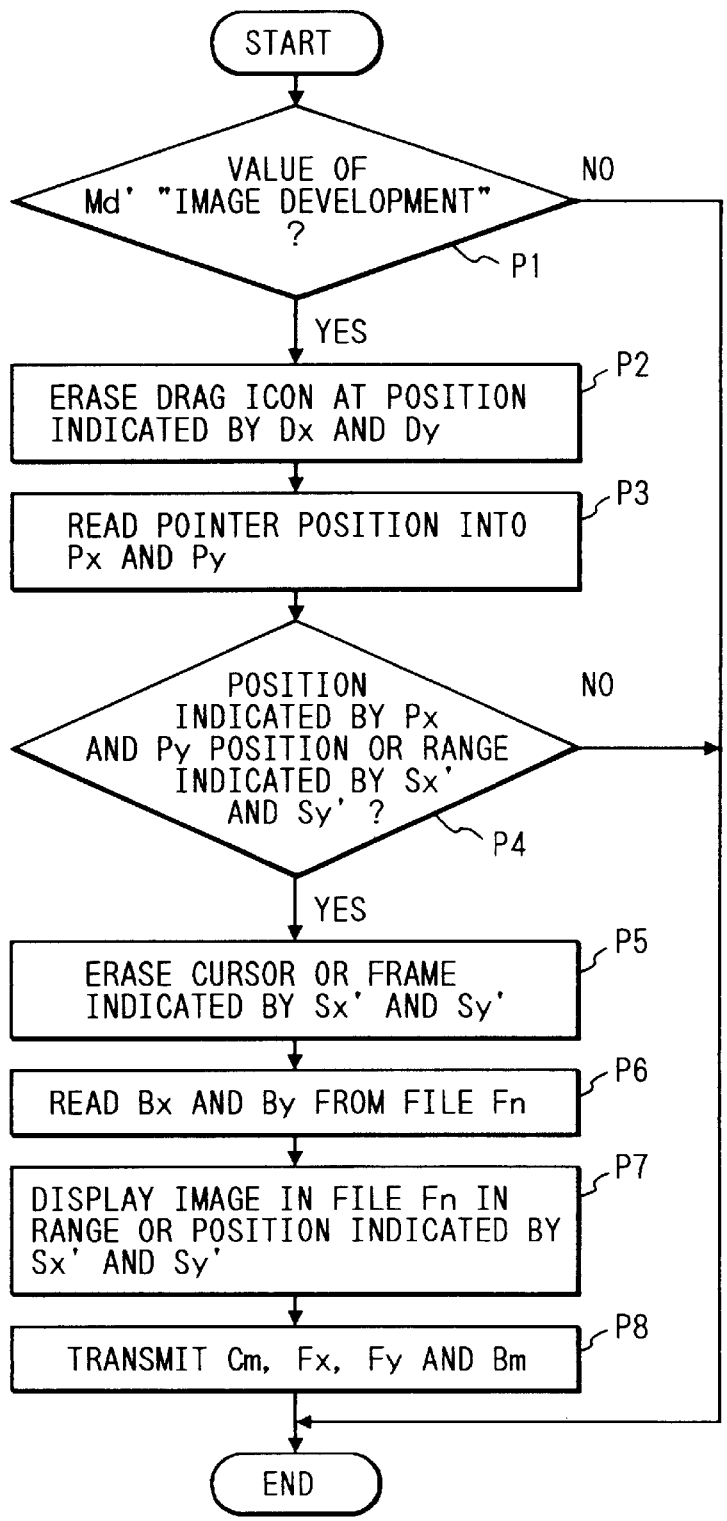
FIG. 28 is a flow chart showing the processing started upon the drop operation of the mouse.

FIG. 28 is a flow chart showing the process started upon the drop operation of the mouse.

Referring to FIG. 28, it is checked in step P1 if the variable Md' is set to be a value representing "image development". If YES in step P1, the flow advances to step P2; otherwise, the process ends.

In step P2, the CPU 301 instructs the display control unit 306 to erase the display of the drag icon 316 at the position indicated by the variables Dx and Dy. Subsequently, in step P3, the CPU 301 reads the position information of the pointer 317 from the display control unit 306 into the variables Px and Py in units of pixels.

The CPU 301 then checks in step P4 if the position of the pointer 317 indicated by the read variables Px and Py corresponds to the position or a position within the range indicated by the arrays Sx(1)', Sx(2)', Sy(1)', and Sy(2)', i.e., the position of the cursor 324 or the position within the range of the frame 325. If YES in step P4, the flow advances to step P5; otherwise, the process ends.

Note that the CPU 301 determines "the position of the cursor 324 or the position within the frame 325" if the following conditions are satisfied:

When $Sx(2)=0$ and $Sy(2)=0$, $Px=Wx(1)+Sx(1)'$ and $Py=Wy(1)+Sy(1)'$

When $Sx(2) \approx 0$ and $Sy(2) \approx 0$, and

The same conditions as in step P3 in FIG. 27 are satisfied.

In step P5, the CPU 301 instructs the display control unit 306 to erase the display of the frame 325 in the range indicated by the arrays Sx(1)', Sx(2)', Sy(1)', and Sy(2)'. Subsequently, in step P6, the CPU 301 reads the numbers of pixels, in the horizontal and vertical directions, of the image 326 corresponding to the file name Fn(i) into the variables Bx and By, respectively.

In step P7, the CPU 301 displays the image 326 corresponding to the file name Fn(i) at the position or within the range indicated by the arrays Sx(1)', Sx(2)', Sy(1)', and Sy(2)'.

In this case, when Sx(2)'=0 and Sy(2)'=0, a smaller one of (Wx(1)+Bx) and Wx(2) is set in the variable Sx(2)1, and a smaller one of (Wy(1)+By) and Wy(2) is set in the variable Sy(2)'. This is to prevent the displayed range of image 326 indicated by the arrays Sx(1)', Sx(2)', Sy(1)', and Sy(2)' from becoming larger than the shared window 312.

The image 326 read from the file Fn(i) and indicated by the array B(i,j) is multiplied with |Sx(1)'−Sx(2)'|/Bx in the horizontal direction, and is multiplied with |Sy(1)'−Sy(2)'|/By in the vertical direction. Note that |α| is the absolute value of a formula α.

In step P8, the CPU 301 stores an image development command in the field Cm, respectively stores the values of the arrays Sx(1)', Sx(2)', Sy(1)', and Sy(2)' in the fields Fx(1), Fx(2), Fy(1), and Fy(2), and stores the value of the image indicated by the array B(i,j) in the field Bm(i,j). The CPU 301 transmits these pieces of field information to a partner apparatus via the line control unit 308, thus ending the process.

Figure 29:
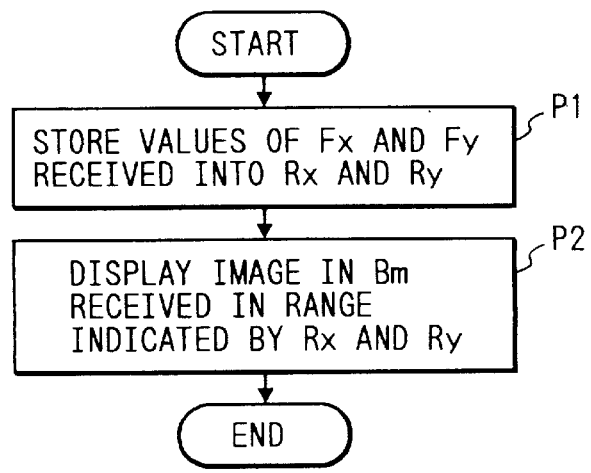
FIG. 29 is a flow chart showing the processing started upon reception of a packet including an image development command.

FIG. 29 is a flow chart showing the process when the line control unit 308 receives a packet including an image development command in the field Cm.

In step P1, the CPU 301 stores information in the fields Fx(1), Fx(2), Fy(1), and Fy(2) received from the line control unit 308 in the arrays Rx(1)', Rx(2)', Ry(1)', and Ry(2)', respectively. In step P2, the CPU 301 develops information in the field T(i) received from the line control unit 308 at the position or within the range indicated by the arrays Rx(1)', Rx(2)', Ry(1)', and Ry(2)', thus ending the process.

As described above, according to this embodiment, by performing the drag & drop operation of the file icon 321 displayed on the display screen 311, the image in the file corresponding to the file icon 321 can be displayed on the shared window 312 and can be transmitted to a partner apparatus. As a result, an image can be easily displayed in the shared window 312.

In the sixth embodiment described above, the image display range is defined by displaying the frame 325. Alternatively, the image display range may be defined by displaying a hatching or changing the display color.

In the sixth embodiment described above, the clicked position corresponds to the upper left end of the image 326. Alternatively, the clicked position may correspond to the center or the lower right end of the image 326.

In step P7 in FIG. 28, when the image 326 indicated by the array B(i,j) is enlarged or reduced in correspondence with the frame 325, the ratio between the horizontal and vertical sizes may vary. However, the following control can maintain the ratio between the horizontal and vertical sizes.

When (|Sx(1)'−Sx(2)'|/Bx)≦(|Sy(1)'−Sy(2)'|By), the image is multiplied with |Sx(1)'−Sx(2)'|/Bx in both the horizontal and vertical directions.

When (|Sx(1)'−Sx(2)'|/Bx)>(|Sy(1)'−Sy(2)'|−By), the image is multiplied with |Sy(1)'−Sy(2)'|/By in both the horizontal and vertical directions.

As has been described in the above fifth and sixth embodiments, by transferring a file such as a text, image, or the like developed or displayed in the shared window 312 between the transmitting and receiving apparatuses connected via the line 309, such a file can be shared.

In a conventional communication apparatus, when a file is transferred to a partner apparatus while the communication apparatus is being used, the file is transferred by separately starting a file transfer application and designating, e.g., the file name of the partner apparatus, or by dragging and dropping the icon of a file to be transmitted in to the shared window.

However, in the conventional apparatus, when a file is transferred while the communication apparatus is being used, the transmitting apparatus cannot confirm if the receiving apparatus has completed file reception.

A communication apparatus according to the seventh embodiment to be described below is achieved to solve this problem.

Seventh Embodiment

Figure 30:
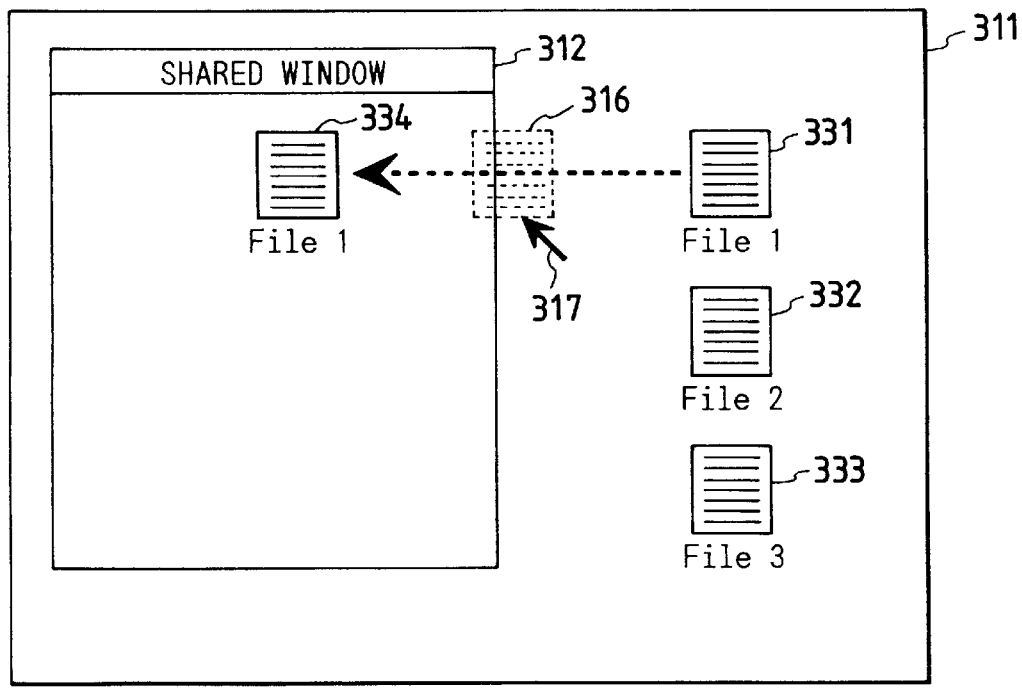
FIG. 30 is a view showing a display example on the display screen upon transmission of a file.

FIG. 30 shows a display example on the screen of the display unit 307 upon transmission of a file. Referring to FIG. 30, file icons 331 to 333 correspond to files such as text files, Image files, or the like stored in the external memory apparatus 304 of the transmitting apparatus. A file icon 334 is displayed in the shared window 312 after the drop operation.

When a file is to be transmitted to a partner apparatus, the file icon 331 corresponding to the file to be transmitted is dragged and dropped onto the shared window 312.

More specifically, the pointer 317 is moved onto a position on the file icon 331 corresponding to the file to be transmitted, and the drag operation is started. During the drag operation, the drag icon 316 is displayed at the position of the moving pointer 317.

Thereafter, when the pointer 317 is moved to a position in the shared window 312 and the drop operation is performed, the file icon 334 is displayed at the position of the drop operation, and the display of the drag icon 316 disappears. Then, the file corresponding to the file icon 334 is transmitted to a partner apparatus.

At this time, the file icon 331 as a drag source remains displayed, and the contents of the file corresponding to this icon are held. Thereafter, upon completion of reception of the file in the partner apparatus, the display of the file icon 334 disappears. With this operation, it is confirmed at the transmitting apparatus if the partner apparatus has completed reception of the file.

Figure 31:
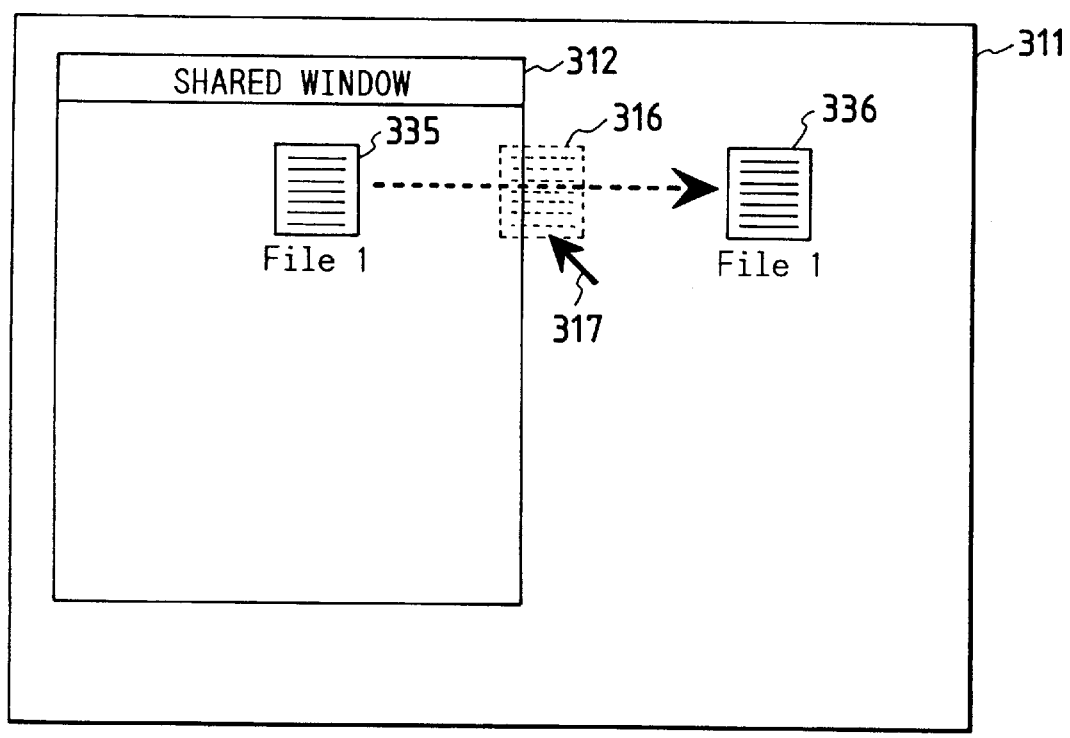
FIG. 31 is a view showing a display example on the display screen upon reception of a file.

FIG. 31 shows a display example on the screen of the display unit 307 upon reception of a file. Referring to FIG. 31, a file icon 335 is displayed within the shared window 312 upon reception of a file from the transmitting apparatus. Also, a file icon 336 is displayed after the drop operation.

Upon reception of a file, the file icon 335 is displayed on the shared window 312. At this time, the received file is stored in a temporary file. In order to save the file stored in the temporary file, the file icon 335 is dragged and dropped outside the shared window 312.

More specifically, when the pointer 317 is moved to a position on the file icon 335 and the drag operation is started, the drag icon 316 is displayed at the position of the pointer 317. Thereafter, when the pointer 317 is moved outside the shared window 312 and the drop operation is performed, the file icon 336 is displayed at the position of the drop operation, and the displays of the file icon 335 and the drag icon 316 disappear. Thus, the file reception is completed.

Figure 32:
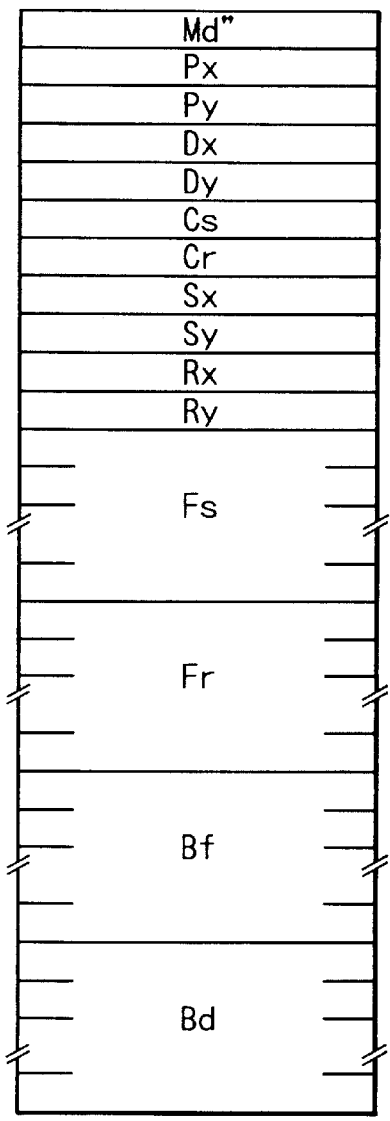
FIG. 32 shows the memory map on the RAM.

FIG. 32 shows the memory map on the RAM 303 in this embodiment.

Note that the same reference symbols in FIG. 32 denote variables or arrays with the same contents as those in the memory map shown in FIG. 14.

A variable Md" stores the operation mode ("transmission" or "reception") of file transfer.

A variable Cs stores a file transmission request command, a variable Cr stores a file reception confirmation command, a variable Sx stores the value of the variable Dx, and a variable Sy stores the value of the variable Dy.

A variable Rx stores the value of a received field Sx, a variable Ry stores the value of a received field Sy, an array Fs stores the file name of a file to be transmitted, and an array Fr stores the received file name (the value of a field Fs). An array Bf stores the bit maps of the file icons 331 to 336, and an array Bd stores the bit map of the drag icon 316.

Assume that when the apparatus of this embodiment is started, the variable Cs is initialized by the file transmission request command, and the variable Cr is initialized by the file reception confirmation command. Also, assume that the array Bf is initialized by the bit maps of the file icons 331 to 336, and the array Bd is initialized by the bit map of the drag icon 316. The bit map information in the initialized arrays Bf and Bd is supplied to the display control unit 306 when the corresponding icons are displayed.

Figure 33:
FIG. 33 is a view showing the format of a packet transmitted from the line control unit.

FIG. 33 shows the format of a packet to be transmitted from the line control unit 308 of the transmitting apparatus.

Referring to FIG. 33, a field Lp stores the length of a packet, a field Cs stores the file transmission request command (variable Cs), a field Sx stores the variable Sx, a field Sy stores the variable Sy, a field Fs stores the file name (array Fs) of a file to be transmitted, and a field Fc stores the contents of a file to be transmitted.

Figure 34:
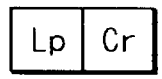
FIG. 34 is a view showing another format of a packet transmitted from the line control unit.

FIG. 34 shows the format of a packet transmitted from the line control unit 308 of the receiving apparatus.

Referring to FIG. 34, a field Lp stores the length of a packet, and a field Cr stores the file reception confirmation command (variable Cr).

FIGS. 35 to 39 are flow charts showing the processes of the program stored in the ROM 302, which are started by the CPU 301 upon generation of corresponding events.

Figure 35:
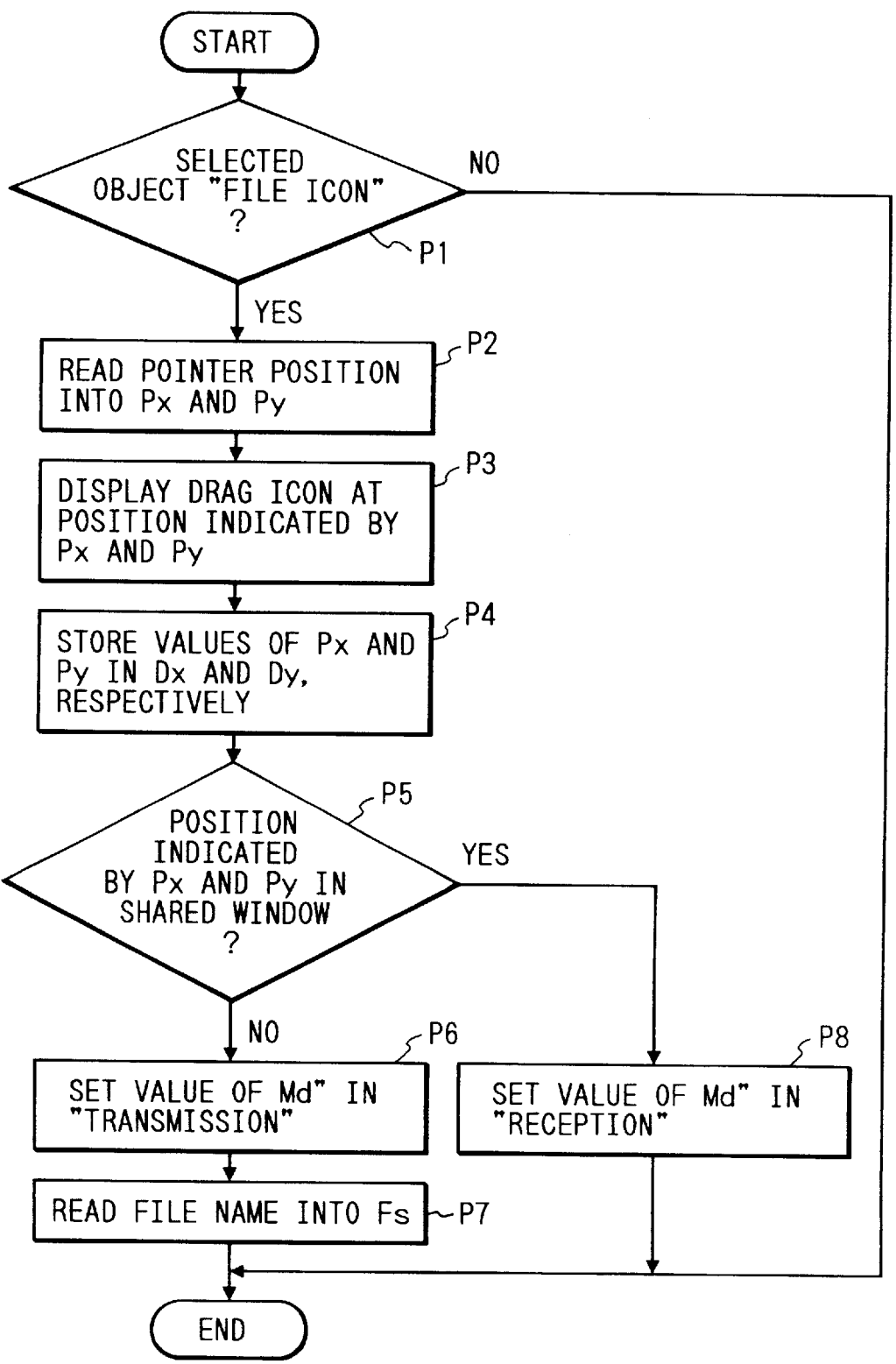
FIG. 35 is a flow chart showing the processing started at the beginning of the drag operation of a mouse.

FIG. 35 is a flow chart showing the process started at the beginning of the drag operation of the mouse. More specifically, this flow chart shows the processes upon designation of the file icon 331 in FIG. 30 or the file icon 335 in FIG. 31.

Referring to FIG. 35, it is checked in step P1 if the type of a currently selected object read from the display control unit 306 is "file icon". If YES in step P1, the flow advances to step P2; otherwise, the process ends.

In step P2, the CPU 301 reads the position information of the pointer 317 from the display control unit 306 into the variables Px and Py. In step P3, the CPU 301 instructs the display control unit 306 to display the drag icon 316 at the position indicated by the variables Px and Py.

The CPU 301 respectively stores the values of the variables Px and Py in the variables Dx and Dy in step P4, and checks in step P5 if the position of the pointer 317 indicated by the variables Px and Py falls within the shared window 312. If NO in step P5, since this corresponds to a case wherein the file icon 331 in FIG. 30 is designated, the flow advances to step P6. On the other hand, if YES in step P5, since this corresponds to a case wherein the file icon 335 in FIG. 31 is designated, the flow advances to step P8.

Note that the CPU 301 reads the position information of the shared window 312 from the display control unit 306, and determines "within the shared window" if the read position information satisfies the following conditions:

Left End of Shared Window<Px<Right End of Shared Window

Lower End of Shared Window<Py<Upper End of Shared Window

When the flow advances from step P5 to step P6, the CPU 301 sets the variable Md" to be a value representing "transmission". In step P7, the CPU 301 reads the file name ("File1" in this case) corresponding to the file icon 331 from the display control unit 306 into the array Fs, thus ending the process. On the other hand, when the flow advances from step P5 to step P8, the CPU 301 sets the variable Md" to be a value representing "reception", thus ending the process.

Figure 36:
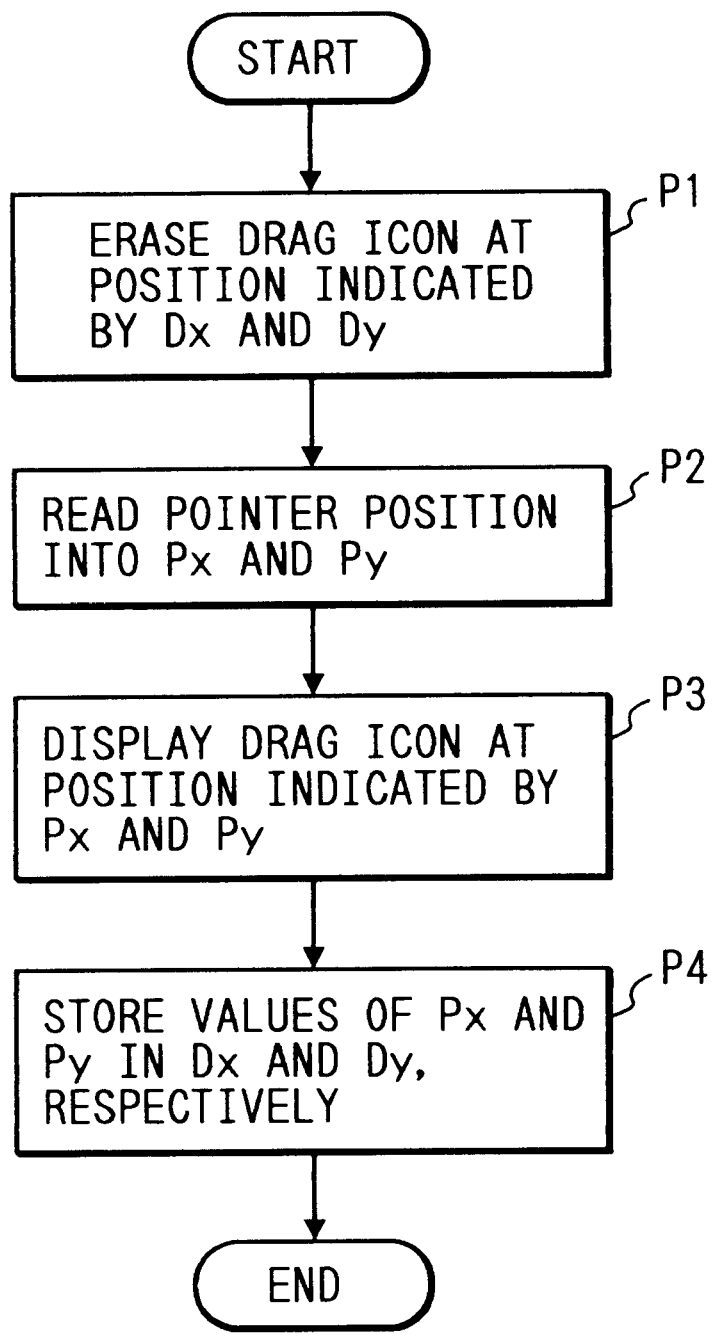
FIG. 36 is a flow chart showing the processing started during the drag operation of the mouse.

FIG. 36 is a flow chart showing the process started when the mouse is being dragged.

Referring to FIG. 36, the CPU 301 instructs the display control unit 306 to erase the display of the drag icon 316 located at the position indicated by the variables Dx and Dy in step P1.

In step P2, the CPU 301 reads the current position information of the pointer 317 from the display control unit 306 into the variables Px and Py. In step P3, the CPU 301 instructs the display control unit 306 to display the drag icon 316 at the position indicated by the read variables Px and Py. Subsequently, in step P4, the CPU 301 respectively stores the values of the variables Px and Py in the variables Dx and Dy, thus ending the process.

Figure 37:
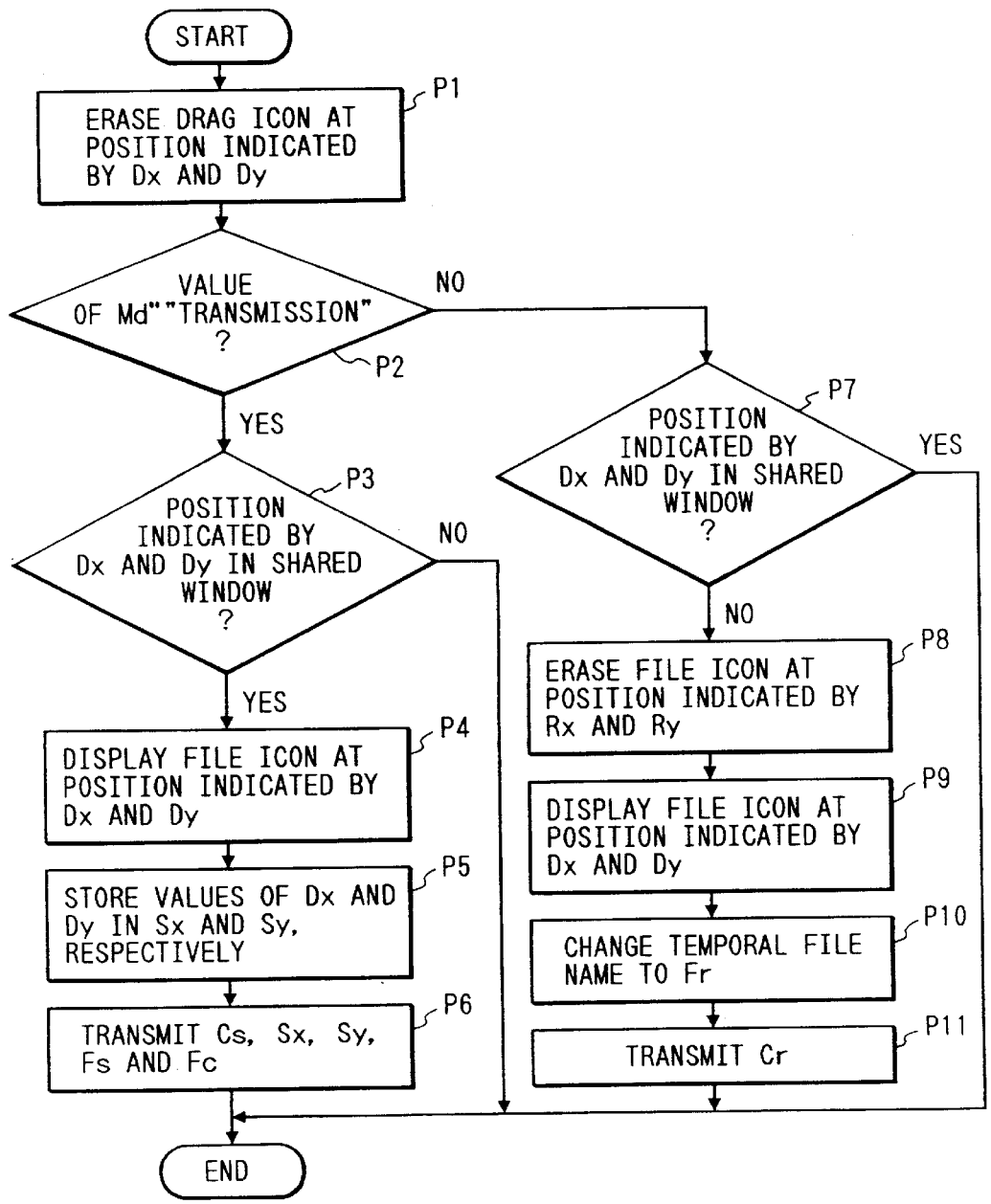
FIG. 37 is a flow chart showing the processing started upon the drop operation of the mouse.

FIG. 37 is a flow chart showing the process started upon the drop operation of the mouse. The processes in steps P1 to P6 in FIG. 37 correspond to those executed when the file icon 331 shown in FIG. 30 is dropped in the shared window 312 to display the file icon 334. On the other hand, the processes in steps P7 to P11 correspond to those executed when the file icon 335 shown in FIG. 31 is dropped outside the shared window 312 to display the file icon 336.

Referring to FIG. 37, in step P1, the CPU 301 instructs the display control unit 306 to erase the display of the drag icon 316 at the position indicated by the variables Dx and Dy. In step P2, the CPU 301 checks if the value of the variable Md" represents "transmission". If YES in step P2, the flow advances to step P3; otherwise, the flow advances to step P7.

In step P3, the CPU 301 checks if the position indicated by the variables Dx and Dy falls within the shared window 312. If YES in step P3, the flow advances to step P4; otherwise, the process ends. In this case, whether or not the position falls within the shared window 312 is discriminated under the same conditions as in step P5 in FIG. 35.

When the flow advances from step P3 to step P4, the CPU 301 instructs the display control unit 306 to display the file icon corresponding to the file name read into the array Fs at the position indicated by the variables Dx and Dy. In step P5, the CPU 301 stores the values of the variables Dx and Dy in the variables Sx and Sy, respectively.

In step P6, the CPU 301 respectively sets the values of the variable Cs, the variable Sx, the variable Sy, and the array Fs, and the contents of a file corresponding to the file name read into the array Fs in the fields Cs, Sx, Sy, Fs, and Fc, and transmits them via the line control unit 308, thus ending the process.

On the other hand, when the flow advances from step P2 to step P7, the CPU 301 checks if the position indicated by the variables Dx and Dy falls within the shared window 312. If YES in step P7, the flow advances to step P8; otherwise, the process ends. Whether or not the position falls within the shared window 312 is also discriminated in step P7 under the same conditions as in step P5 in FIG. 35.

In step P8, the CPU 301 instructs the display control unit 306 to erase the display of the file icon 335 at the position indicated by the variables Rx and Ry. In step P9, the CPU 301 instructs the display control unit 306 to display the file icon 336 corresponding to the file name read into the array Fs at the position indicated by the variables Dx and Dy.

In step P10, the CPU 301 changes the name of the temporary file to the name indicated by the value of the array Fr. In step P11, the CPU 301 sets the value of the variable Cr in the field Cr, and transmits it via the line control unit 308, thus ending the process.

Figure 38:
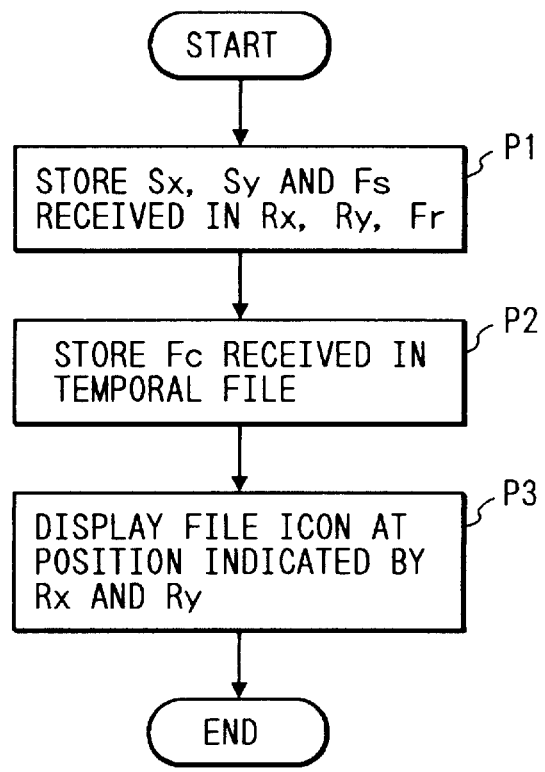
FIG. 38 is a flow chart showing the processing started upon reception of the packet shown in FIG. 33.

FIG. 38 is a flow chart started when the line control unit 308 receives a packet including the field Cs, as shown in FIG. 33.

In step P1, the CPU 301 respectively stores the values in the fields Sx, Sy, and Fs received from the line control unit 308 in the variable Rx, the variable Ry, and the array Fr.

The CPU 301 stores the value in the field Fc received from the line control unit 308 in a temporary file in step P2, and instructs the display control unit 306 to display the file icon 335 corresponding to the file name read into the array Fs at the position indicated by the variables Rx and Ry in step P3, thus ending the process.

Figure 39:
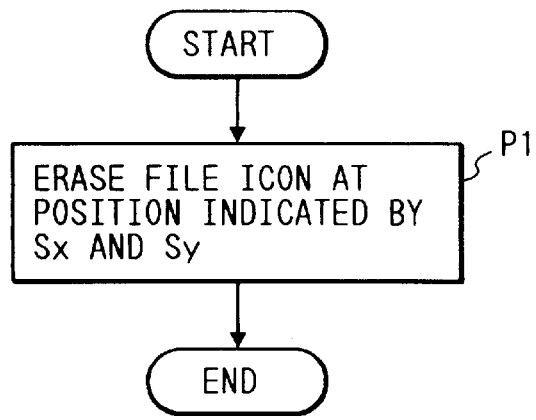
FIG. 39 is a flow chart showing the processing started upon reception of the packet shown in FIG. 34.

FIG. 39 is a flow chart started when the line control unit 308 receives a packet including the field Cr, as shown in FIG. 34.

In this case, in step P1, the CPU 301 instructs the display control unit 306 to erase the display of the file icon 334 at the position indicated by the variables Sx and Sy, thus ending the process.

In the above description of the seventh embodiment, the shared windows 312 on the transmitting and receiving apparatuses are located at the same position in their screens 311. Alternatively, the position information of the file icon 334 relative to the shared window 312 on the transmitting apparatus may be transmitted to the receiving apparatus. With this operation, the shared windows 312 of the transmitting and receiving apparatuses need not always be displayed at the same position.

In the seventh embodiment described above, the file icon 334 in FIG. 30 and the file icon 335 in FIG. 31 are displayed at the same position in the shared windows 312 of the transmitting and receiving apparatuses. However, the file icon 335 may be displayed at a fixed position (e.g., at the upper left end or the center) in the shared window 312 of the receiving apparatus.

At this time, the variables Rx and Ry are initialized in advance by values indicating the fixed display position of the file icon 335. Also, the fields Sx and Sy are not required. Therefore, in step P6 in FIG. 37, the values of the fields Sx and Sy are not transmitted to the receiving apparatus. Also, in step P1 in FIG. 38, the values of the fields Sx and Sy are not received, and are not stored in the variables Rx and Ry.

In the seventh embodiment described above, the name of the received file becomes the same as that in the transmitting apparatus. When the file icon 335 is dragged outside the shared window 312, a new name may be assigned to the received file.

Furthermore, in the fifth to seventh embodiments described above, a LAN is used as the line 309 connected to terminals. However, the present invention may be applied to a basic interface of an ISDN, a primary group interface of an ISDN, a wide-area ISDN, a line exchange network, a packet exchange network, a public telephone network, a special line, a private branch exchange (PBX), and the like.

In the fifth to seventh embodiments described above, the ROM 302 and the RAM 303 are used as memory apparatuses for storing a program and data. Alternatively, a floppy disk, a hard disk, an IC card, and the like may be used.

In the fifth to seventh embodiments described above, text development, image display, file transmission, or the like is performed by dragging the file icons 313 to 315. Alternatively, a folder icon may be dragged to perform text development, image display, or file transmission in the folder. Note that the folder is a group of a plurality of files to which a single name is assigned.

In the fifth to seventh embodiments described above, a text or image is transmitted in a single packet. However, when the amount of data of a text or image is large, the text or image may be transmitted in a plurality of divided packets.

As described above, since means for developing information (e.g., a text or image) in a file onto a shared screen by executing a predetermined operation (e.g., the drag & drop operation) for icons displayed in correspondence with various files, and sharing the information in the file with a partner apparatus is arranged, information corresponding to the icon can be read onto the shared screen by executing only the drag & drop operation of the icon without requiring starting of an editor every time the file is to be transmitted. For this reason, information in the file can be easily and quickly read onto the shared screen.

Since means for, when a file is transmitted from a transmitting apparatus to a receiving apparatus, displaying a file icon corresponding to a transmitted file on the screen of the transmitting apparatus, and erasing the display of the file icon upon completion of the file reception in the receiving apparatus is arranged, whether or not the receiving apparatus has completed the file reception can be confirmed at the transmitting apparatus when a file is transmitted to a partner apparatus during the use of the communication apparatus, thus allowing smooth information exchange.

What is claimed is:

1. A communication apparatus comprising:

receiving means for receiving images from a plurality of external apparatuses;

display means for displaying (i) information which said communication apparatus holds, and (ii) the images received by said receiving means;

instruction means for moving a display position of the information which said communication apparatus holds, on said display means so as to provide an instruction regarding to which of said plurality of external apparatuses the information which said communication apparatus holds is transmitted; and transmission means for transmitting the information which said communication apparatus holds to said external apparatus in response to the information which said communication apparatus holds being moved onto the received image by said instruction means, wherein said display means displays two or more apparatuses instructed among said plurality of external apparatuses by said instruction means in such a manner that the instructed two or more apparatuses can be identified from the rest of the external apparatuses which are not instructed, and wherein said transmission means then transmits said information to said two or more terminals instructed by said instruction means, based on a predetermined operation of a user.

2. An apparatus according to claim 1, wherein the images received by said receiving means comprise information corresponding to an operator of the external apparatus.

3. An apparatus according to claim 1, wherein the images received by said receiving means comprise line information of the external apparatus.

4. An apparatus according to claim 1, wherein said communication apparatus comprises a television telephone apparatus.

5. An apparatus according to claim 1, wherein said communication apparatus comprises a television meeting apparatus.

6. An apparatus according to claim 1, further comprising:
storage means for storing the information of said communication apparatus.

7. An apparatus according to claim 1, wherein the information of said communication apparatus is displayed as an icon on said display means.

8. An apparatus according to claim 1, wherein said instruction means comprises a mouse.

9. An apparatus according to claim 1, wherein the instruction provided by said instruction means is attained by drag and drop operations.

10. An apparatus according to claim 1, further comprising:
discrimination means for discriminating a display position after a position movement caused by said instruction means; and
control means for controlling said transmission means in accordance with a discrimination result of said discrimination means.

11. An apparatus according to claim 1, further comprising:
reception means for receiving storage capacity information of the external apparatus from the external apparatus; and
transmission control means for controlling transmission of said transmission means in accordance with the storage capacity information received by said reception means.

12. An apparatus according to claim 11, wherein said transmission control means compares the storage capacity information and a data capacity of the information of said communication apparatus, and when the data capacity of the information of said communication apparatus is larger than the storage capacity information, said transmission control means stops transmission of the information of said communication apparatus.

13. An apparatus according to claim 1, further comprising:
display changing means for changing a display state of the information of said communication apparatus in correspondence with transmission of the information of said communication apparatus to the external apparatus.

14. An apparatus according to claim 13, wherein the display state is changed after completion of the transmission.

15. A communication apparatus which is connected to a partner apparatus via a transmission line, is coupled to a display and a storing means, and has a shared window with the partner apparatus, comprising:
means for storing a file;
means for displaying information;
output means for outputting to display on the display means an image corresponding to a file stored in the storing means;
sense means for sensing an instruction to move said image onto the shared window and developing said file on the shared window in response to the sensing of said sense means being displayed on the display means;
recognition means for recognizing that a partner apparatus has received said information; and
processing means for transmitting said file and altering the image on the display means corresponding to said file in response to said recognition means recognizing that said partner apparatus has received the information.

16. An apparatus according to claim 15, wherein the movement operation is attained by drag and drop operations for the icon.

17. An apparatus according to claim 15, wherein the information in the file shared with the partner apparatus comprises text data.

18. An apparatus according to claim 15, wherein the information in the file shared with the partner apparatus comprises image data.

19. An apparatus according to claim 18, further comprising:
display control means for changing the file icon to a drag icon and displaying the drag icon during the drag operation of the file icon.

20. An apparatus according to claim 18, further comprising:
means for, when an image in the file corresponding to the dragged file icon is displayed in a designated range in the shared window, enlarging or reducing the image in accordance with the same or different vertical and horizontal magnifications, so that the image is prevented from falling outside the designated range.

21. A method of communicating between a communication apparatus and an external apparatus, comprising the steps of:
a receiving step for receiving images from a plurality of external apparatuses;
a display step for displaying on a display means (i) information which said communication apparatus holds, and (ii) the images received in said receiving step;
an instruction step for moving a display position of the information which said communication apparatus holds, on said display means so as to provide an instruction regarding to which of said plurality of external apparatuses the information which said communication apparatus holds is transmitted; and
a transmission step, for transmitting the information which said communication apparatus holds to said external apparatus in response to the information which said communication apparatus holds being moved onto the received image by said instruction step,
wherein said display step displays two or more apparatuses instructed among said plurality of external apparatuses by said instruction step in such a manner that the instructed two or more apparatuses can be identified from the rest of the external apparatuses which are not instructed, and wherein said transmission step then transmits said information to said two or more terminals instructed by said instruction step based on a predetermined operation of a user.

22. A method according to claim 21, wherein the images received in said receiving step comprise information corresponding to an operator of the external apparatus.

23. A method according to claim 21, wherein the images received in said receiving step comprises line information of the external apparatus.

24. A method according to claim 21, wherein said communication apparatus comprises a television telephone apparatus.

25. A method according to claim 21, wherein said communication apparatus comprises a television meeting apparatus.

26. A method according to claim 21, further comprising a storage step for storing the information of said communication apparatus.

27. A method according to claim 21, wherein the information of said communication apparatus is displayed as an icon on said display means.

28. A method according to claim 21, wherein said instruction step comprises the step of utilizing a mouse to provide said instruction.

29. A method according to claim 21, wherein the instruction provided by said instruction step is attained by drag and drop operations.

30. A method according to claim 21, further comprising:
a discrimination step for discriminating a display position after a position movement caused by said instruction step; and
a control step for controlling said transmission step in accordance with a discrimination result of said discrimination step.

31. A method according to claim 21, further comprising:
a reception step for receiving storage capacity information of the external apparatus from the external apparatus; and
a transmission control step for controlling transmission of said transmission step in accordance with the storage capacity information received by said reception step.

32. A method according to claim 21, wherein said transmission control step compares the storage capacity information of a data capacity of the information of said communication apparatus, and when the data capacity of the information of said communication apparatus is larger than the storage capacity information, said transmission control step stops transmission of the information of said communication apparatus.

33. A method according to claim 21, further comprising a display changing step for changing a display state of the information of said communication apparatus in correspondence with transmission of the information of said communication apparatus to the external apparatus.

34. A method according to claim 33, wherein the display state is changed after completion of the transmission.

35. A method for communicating with a communication apparatus which is connected to a partner apparatus via a transmission line, is coupled to a display and a storing means, and has a shared window with the partner apparatus, comprising the steps of:
an output step for outputting to display on the display means an image corresponding to a file stored in the storing means;
a displaying step for displaying information;
a sensing step for sensing an instruction to move said image onto the shared window and developing said file on said shared window in response to the sensing of said sensing step being displayed on the display;
a recognition step for recognizing that a partner apparatus has received said information; and
a processing step for transmitting said file and altering the image on the display means corresponding to said file in response to said recognition step recognizing that said partner apparatus has received the information.

36. A method according to claim 35, wherein the movement operation is attained by drag and drop operations for the icon.

37. A method according to claim 35, wherein the information in the file shared with the partner apparatus comprises text data.

38. A method according to claim 35, wherein the information in the file shared with the partner apparatus comprises image data.

39. A method according to claim 38, further comprising a modifying step for, when an image in the file corresponding to the dragged file icon is displayed in a designated range in the shared window, enlarging or reducing the image in accordance with the same or different vertical and horizontal magnifications, so that the image is prevented from falling outside the designated range.

40. A method according to claim 39, further comprising a display control step for changing the file icon to a drag icon and displaying the dragged icon during the drag operation of the file icon.

41. A method according to claim 39, further comprising a display control step for changing the file icon to a drag icon and displaying the dragged icon during the drag operation of the file icon.

42. A computer readable storage medium for enhancing communications between a communication apparatus and an external apparatus, said computer readable storage medium storing code which causes one or more computers to perform the steps of:
receiving images from a plurality of external apparatuses;
displaying on a display means (i) information which said communication apparatus holds, and (ii) the images received in said receiving step;
an instruction step for moving a display position of the information which said communication apparatus holds, on said display means so as to provide an instruction regarding to which of said plurality of external apparatuses the information which said communication apparatus holds is transmitted; and
a transmission step, for transmitting the information which said communication apparatus holds to said external apparatus in response to the information which said communication apparatus holds being moved onto the received image by said instruction step,
wherein the displaying step displays two or more apparatuses instructed among said plurality of external apparatuses by said instruction step in such a manner that the instructed two or more apparatuses can be identified from the rest of the external apparatuses which are not instructed, and wherein said transmission step then transmits said information to said two or more terminals instructed by said instruction step, based on a predetermined operation of a user.

43. A computer readable storage medium for enhancing communications among a communication apparatus which is connected to a partner apparatus via a transmission line, is coupled to a display and a storing means, and has a shared window with the partner apparatus, said computer readable storage medium storing code which causes one or more computers to perform the steps of:
outputting to display on the display means an image corresponding to a file stored in the storing means;
a displaying step for displaying information;
sensing an instruction to move said image onto the shared window and developing said file on said shared window in response to the sensing of said sensing step being displayed on the display;
a recognition step for recognizing that a partner apparatus has received said information; and
a processing step for transmitting said file and altering the image on the display means corresponding to said file in response to said recognition step recognizing that said partner apparatus has received the information.

* * * * *